United States Patent
Kemmochi et al.

(10) Patent No.: US 10,645,234 B2
(45) Date of Patent: May 5, 2020

(54) IMAGE PROCESSING APPARATUS, IMAGE PROCESSING SYSTEM, AND IMAGE PROCESSING METHOD

(71) Applicant: Ricoh Company, Ltd., Tokyo (JP)

(72) Inventors: Eiji Kemmochi, Tokyo (JP); Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 148 days.

(21) Appl. No.: 15/647,377

(22) Filed: Jul. 12, 2017

(65) Prior Publication Data

US 2017/0310830 A1 Oct. 26, 2017

Related U.S. Application Data

(63) Continuation of application No. PCT/JP2016/000281, filed on Jan. 20, 2016.

(30) Foreign Application Priority Data

Jan. 21, 2015 (JP) ................... 2015-009387

(51) Int. Cl.
*G06F 17/30* (2006.01)
*H04N 1/00* (2006.01)
(Continued)

(52) U.S. Cl.
CPC ..... *H04N 1/00204* (2013.01); *G06F 3/03545* (2013.01); *G06F 3/0421* (2013.01);
(Continued)

(58) Field of Classification Search
CPC .................................................. G06F 17/30
See application file for complete search history.

(56) References Cited

U.S. PATENT DOCUMENTS 8,261,967 B1 * 9/2012 Long .................. G09B 5/062
235/375
9,866,611 B2 * 1/2018 Omura ................ G06F 3/1431
(Continued)

FOREIGN PATENT DOCUMENTS

CN 102025885 A 4/2011
CN 102707816 A 10/2012
(Continued)

OTHER PUBLICATIONS

Extended Search Report dated Dec. 12, 2017 in European Patent Application No. 16739949.2.
(Continued)

*Primary Examiner* — Olga V Merkoulova
(74) *Attorney, Agent, or Firm* — Xsensus LLP

(57) ABSTRACT

An image processing apparatus includes an event acquisition unit that acquires a pen event based on an operation on a screen; a drawing-click determining unit that determines whether the pen event is an event concerning a stroke of a dot image or concerning a click operation; and a countdown timer that starts clocking when the drawing-click determining unit receives a determination-target pen event to determine, wherein the drawing-click determining unit determines that the determination-target pen event is an event concerning a stroke of a dot image when the clocking has ended and the event acquisition unit has acquired a pen event concerning another stroke, or when an elapsed time from an end of a pen event concerning another stroke acquired prior to the determination-target pen event is within a certain period of time.

11 Claims, 21 Drawing Sheets

(51) Int. Cl.
*G06F 16/16* (2019.01)
*G06F 3/0354* (2013.01)
*G06F 3/0488* (2013.01)
*G06F 3/042* (2006.01)
*H04N 1/029* (2006.01)

(52) U.S. Cl.
CPC ........ *G06F 3/04883* (2013.01); *G06F 16/168* (2019.01); *H04N 1/00411* (2013.01); *G06F 2203/0383* (2013.01); *H04N 1/029* (2013.01); *H04N 2201/0094* (2013.01)

(56) References Cited

U.S. PATENT DOCUMENTS

| | | | |
|---|---|---|---|
| 2003/0128244 A1* | 7/2003 | Iga | G06F 3/0488 715/863 |
| 2010/0051356 A1* | 3/2010 | Stern | G06F 3/03545 178/19.04 |
| 2011/0063215 A1 | 3/2011 | Mishima et al. | |
| 2012/0235934 A1* | 9/2012 | Kawasaki | G06F 3/03545 345/173 |
| 2013/0135346 A1 | 5/2013 | Sakuramata et al. | |
| 2015/0035782 A1 | 2/2015 | Kawasaki et al. | |
| 2016/0110002 A1 | 4/2016 | Chen | |

FOREIGN PATENT DOCUMENTS

| | | |
|---|---|---|
| CN | 103744550 A | 4/2014 |
| EP | 2500801 | 9/2012 |
| JP | 11-282624 | 10/1999 |
| JP | 2005-301406 | 10/2005 |
| JP | 2012-043251 | 3/2012 |
| JP | 2013-097737 | 5/2013 |
| JP | 2013-131204 | 7/2013 |
| JP | 2015-070345 | 4/2015 |

OTHER PUBLICATIONS

International Search Report dated Mar. 22, 2016 in PCT/JP2016/000281 filed on Jan. 20, 2016.
Written Opinion dated Mar. 22, 2016 in PCT/JP2016/000281 filed on Jan. 20, 2016.
Office Action dated Jul. 1, 2019, issued in corresponding Chinese Patent Application No. 201680006506.0 (with English translation) 19 pages.

* cited by examiner

UI IMAGE (A) LAYER    STROKE IMAGE (B) LAYER    OUTPUT IMAGE (C) LAYER    BACKGROUND IMAGE (D) LAYER

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

| STROKE DATA ID | START TIME | END TIME | COLOR | WIDTH | COORDINATE ARRANGEMENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ⋮ | ⋮ | ⋮ | ⋮ | ⋮ | ⋮ | st001, st002, st003 ...

| X-COORDINATE VALUE | Y-COORDINATE VALUE | DIFFERENCE TIME | PEN PRESSURE |
|---|---|---|---|
| 10 | 10 | 100 | 255 |
| 12 | 10 | 200 | 255 |
| 14 | 12 | 300 | 255 |
| . | . | . | . |

| MEDIA DATA ID | DATA TYPE | RECORDING TIME | X-COORDI- NATE VALUE | Y-COORDI- NATE VALUE | WIDTH | HEIGHT | IMAGE DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| . | . | . | . | . | . | . | . |

| PRODUCT ID | LICENSE ID | EXPIRY DATE |
|---|---|---|
| 1001 | 12345678abcdefgh | 2012/12/31 |
| 1001 | 4321dcba8765hgfe | – |
| . | . | . |

FIG.11

| NAME | MAIL ADDRESS |
|---|---|
| TARO | taro@alpha.co.jp |
| HANAKO | hanako@beta.co.jp |
| - | jiro@gamma.co.jp |
| ⋮ | ⋮ |

FIG.12

| |
|---|
| iwb-20130610104423.pdf |
| iwb-20130625152245.pdf |
| iwb-20130628113418.pdf |
| ⋮ |

FIG.13

| NAME | IP ADDRESS |
|---|---|
| MEETING ROOM 1 | 192.0.0.1 |
| MEETING ROOM 2 | 192.0.0.2 |
| - | 192.0.0.3 |
| ⋮ | ⋮ |

FIG.14

| NAME | IP ADDRESS |
|---|---|
| MEETING ROOM 1 | 192.0.0.1 |
| MEETING ROOM 2 | 192.0.0.2 |
| - | 192.0.0.8 |
| ⋮ | ⋮ |

FIG.16

| SEQ | OPERA-TION NAME | TRANSMIS-SION SOURCE IP ADDRESS: PORT NO. | DESTINATION IP ADDRESS: PORT NO. | OPERA-TION TYPE | OPERATION TARGET (PAGE DATA ID/ STROKE DATA ID) | DATA |
|---|---|---|---|---|---|---|
| 1 | ADD | 192.0.0.1:50001 | 192.0.0.1:50000 | STROKE | p005 | ...... (STROKE DATA) |
| 2 | ADD | 192.0.0.1:50000 | 192.0.0.2:50001 | STROKE | p005 | ...... (STROKE DATA) |
| 3 | UPDATE | 192.0.0.2:50001 | 192.0.0.1:50000 | STROKE | p006 | (50,40) |
| 4 | UPDATE | 192.0.0.1:50000 | 192.0.0.1:50001 | STROKE | p006 | (50,40) |
| 5 | DELETE | 192.0.0.2:50001 | 192.0.0.1:50000 | STROKE | p007 | – |
| 6 | DELETE | 192.0.0.1:50000 | 192.0.0.1:50001 | STROKE | p007 | – |
| 7 | ADD | 192.0.0.1:50001 | 192.0.0.1:50000 | PAGE | – | – |
| 8 | ADD | 192.0.0.1:50000 | 192.0.0.2:50001 | PAGE | – | – |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ⋮ | ⋮ | ⋮ | ⋮ | ⋮ | ⋮ | ⋮ |

IMAGE PROCESSING APPARATUS, IMAGE PROCESSING SYSTEM, AND IMAGE PROCESSING METHOD

CROSS-REFERENCE TO RELATED APPLICATIONS

This application is a continuation of PCT international application Ser. No. PCT/JP2016/000281 filed on Jan. 20, 2016 which designates the United States, incorporated herein by reference, and which claims the benefit of priority from Japanese Patent Applications No. 2015-009387, filed on Jan. 21, 2015, incorporated herein by reference.

BACKGROUND OF THE INVENTION

1. Field of the Invention

The present invention relates to an image processing apparatus, an image processing system, and an image processing method, and in particular, to an image processing apparatus used by being connected to a network line, an image processing system including an information processing apparatus having a communication function that is connected to the image processing apparatus via the network line, and an image processing method executed in the image processing apparatus.

2. Description of the Related Art

In recent years, an electronic blackboard referred to as an electronic information board in which a touch panel is installed on a flat panel display such as a liquid crystal display and a plasma display or on a projection screen of a projector has been utilized in normal meetings and remote meetings. For example, Japanese Laid-open Patent Publication No. 2013-131204 discloses an electronic blackboard (an electronic information board) that can display on the screen thereof, by connecting a personal computer (PC), an image displayed on the PC.

While stroke drawing is performed on a conventional electronic blackboard including the electronic blackboard described in Japanese Laid-open Patent Publication No. 2013-131204, however, there arises a problem of how to discriminate a stroke of a dot image from a click operation when performing a remote operation on a PC and others from the electronic blackboard.

SUMMARY OF THE INVENTION

In view of the foregoing, there is a need to provide an image processing apparatus, an image processing system, and an image processing method capable of performing a click operation remotely on an information processing apparatus such as a PC while performing stroke drawing.

According to an exemplary embodiment of the present invention, there is provided an image processing apparatus comprising: an event acquisition unit that acquires a pen event based on an operation on a screen; a drawing-click determining unit that determines whether the pen event is an event concerning a stroke of a dot image or concerning a click operation; and a countdown timer that starts clocking when the drawing-click determining unit receives a determination-target pen event to determine, wherein the drawing-click determining unit determines that the determination-target pen event is an event concerning a stroke of a dot image when the clocking has ended and the event acquisition unit has acquired a pen event concerning another stroke, or when an elapsed time from an end of a pen event concerning another stroke acquired prior to the determination-target pen event is within a certain period of time.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a conceptual diagram illustrating an address-book management table;

FIG. 12 is a conceptual diagram illustrating backup data;

FIG. 13 is a conceptual diagram illustrating a connection-destination management table;

FIG. 14 is a conceptual diagram illustrating a participation-point management table;

FIG. 16 is a conceptual diagram illustrating operation data;

DETAILED DESCRIPTION OF THE PREFERRED EMBODIMENTS

Figure 1:
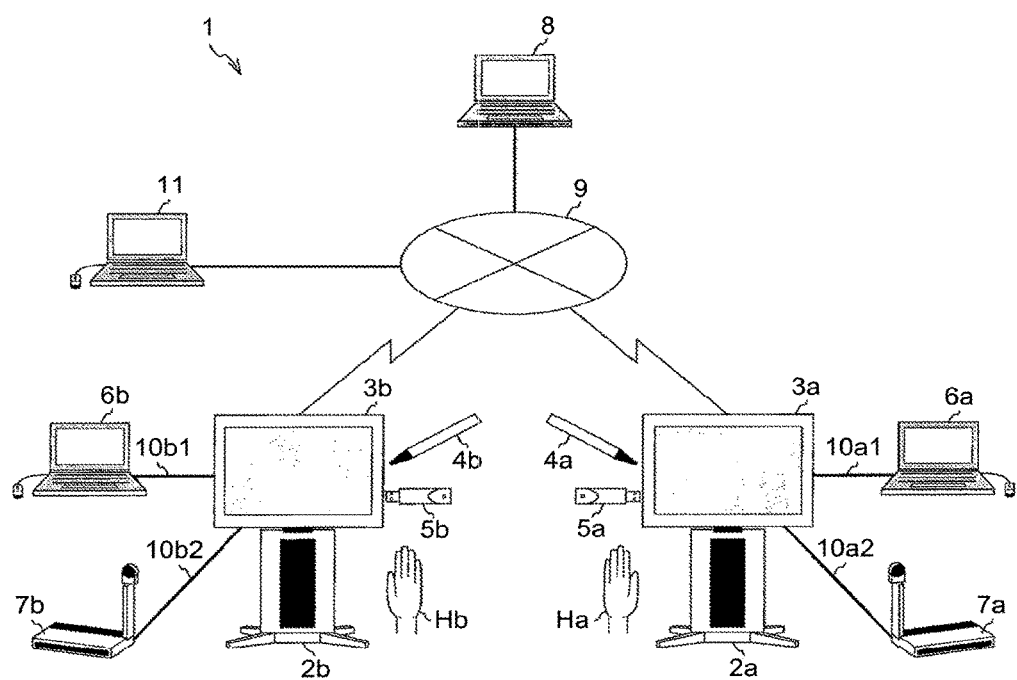
FIG. 1 is an overall configuration diagram of an image processing system according to one embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes one exemplary embodiment of the invention based on FIGS. 1 to 30. However, the constituent elements, types, combinations, shapes, and relative placement described in the embodiment are not intended to limit the scope of the invention to those but are merely explanatory examples, unless otherwise specifically described.

Outline of Image Processing System 1

First, the outline of an image processing system 1 will be described.

In FIG. 1, the configuration of the image processing system 1 according to the embodiment is illustrated. The image processing system 1 includes electronic blackboards 2a and 2b as a plurality (two in the example in FIG. 1) of image processing apparatuses that are connected to be able to communicate with one another via a communication network 9 as a network line, a personal computer (PC) 8, and a notebook computer (notebook PC) 11 as an information processing apparatus. The image processing system 1 may be configured by including, not limited to two, three or more electronic blackboards. In the embodiment, the communication network 9 is assumed to be a corporate wireless LAN as one example.

The electronic blackboard 2a (2b) includes a display 3a (3b) as a display unit. Although the display 3a (3b) is a constituent element of the electronic blackboard 2a (2b) as the image processing apparatus, the display is illustrated separately from the electronic blackboard in FIGS. 1 to 3 and others, for the convenience of explanation. The display 3a (3b) is accompanied with an electronic pen 4a (4b), a USB memory 5a (5b), and others. To the electronic blackboard 2a (2b), connected are a notebook PC 6a (6b), a TV (video) conference terminal 7a (7b), and others.

Figures 4, 5, 6:
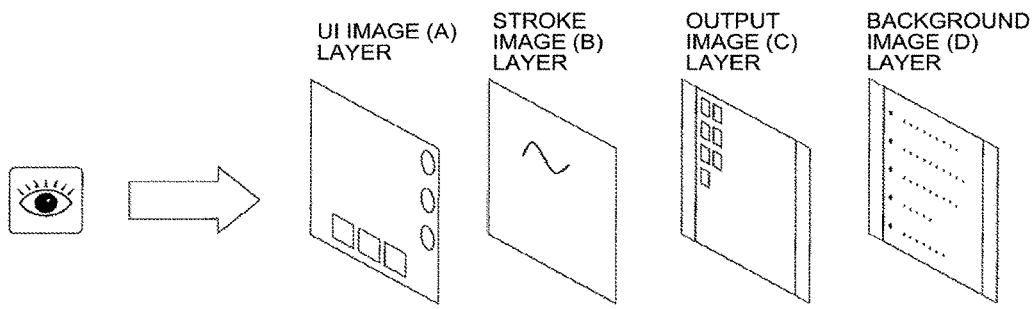
FIG. 4 is a configuration diagram of image layers.
FIG. 5 is a conceptual diagram illustrating page data.
FIG. 6 is a conceptual diagram illustrating stroke data.

The display 3a (3b) is a multi-layer display having a plurality of display panels (layers) disposed in layers, and by displaying images different from one another on the respective layers, displays toward a user a single image in which those images are superimposed (see FIG. 4). The display 3a (3b) is a touch-panel display equipped with a later-described contact sensor composed of one type of touch panel. The display 3a (3b) can detect an event such as a contact (a touch) on its screen with a pen tip or a pen top of the electronic pen 4a (4b), and display on the screen an image drawn by that event. The display 3a (3b) can also detect gestures such as flick, swipe, and pinch (in/out) with a hand Ha (Hb) and the like of the user, and can expand and reduce an image displayed on the screen and turn (change) a page.

To the display 3a (3b), the USB memory 5a (5b) can be connected. The electronic blackboard 2a (2b) can read out an electronic file such as a PDF file from the USB memory 5a (5b) connected to the display 3a (3b) and write an electronic file into the USB memory 5a (5b).

The notebook PC 6a (6b) is connected to the electronic blackboard 2a (2b) via a cable 10a1 (10b1) that is capable of performing communication conforming to the standard such as DisplayPort, digital visual interface (DVI), high-definition multimedia interface (HDMI, registered trademark), and video graphics array (VGA). Consequently, event information (detection result of an event) detected by the display 3a (3b) can be transmitted to the notebook PC 6a (6b). The TV (video) conference terminal 7a (7b) is also connected to the electronic blackboard 2a (2b) via a cable 10a2 (10b2) capable of performing communication conforming to the same standard. The notebook PC 6a (6b) and the TV conference terminal 7a (7b) may be connected to the electronic blackboard 2a (2b) via wireless communication conforming to various wireless communication protocols such as Bluetooth (registered trademark).

Figure 3:
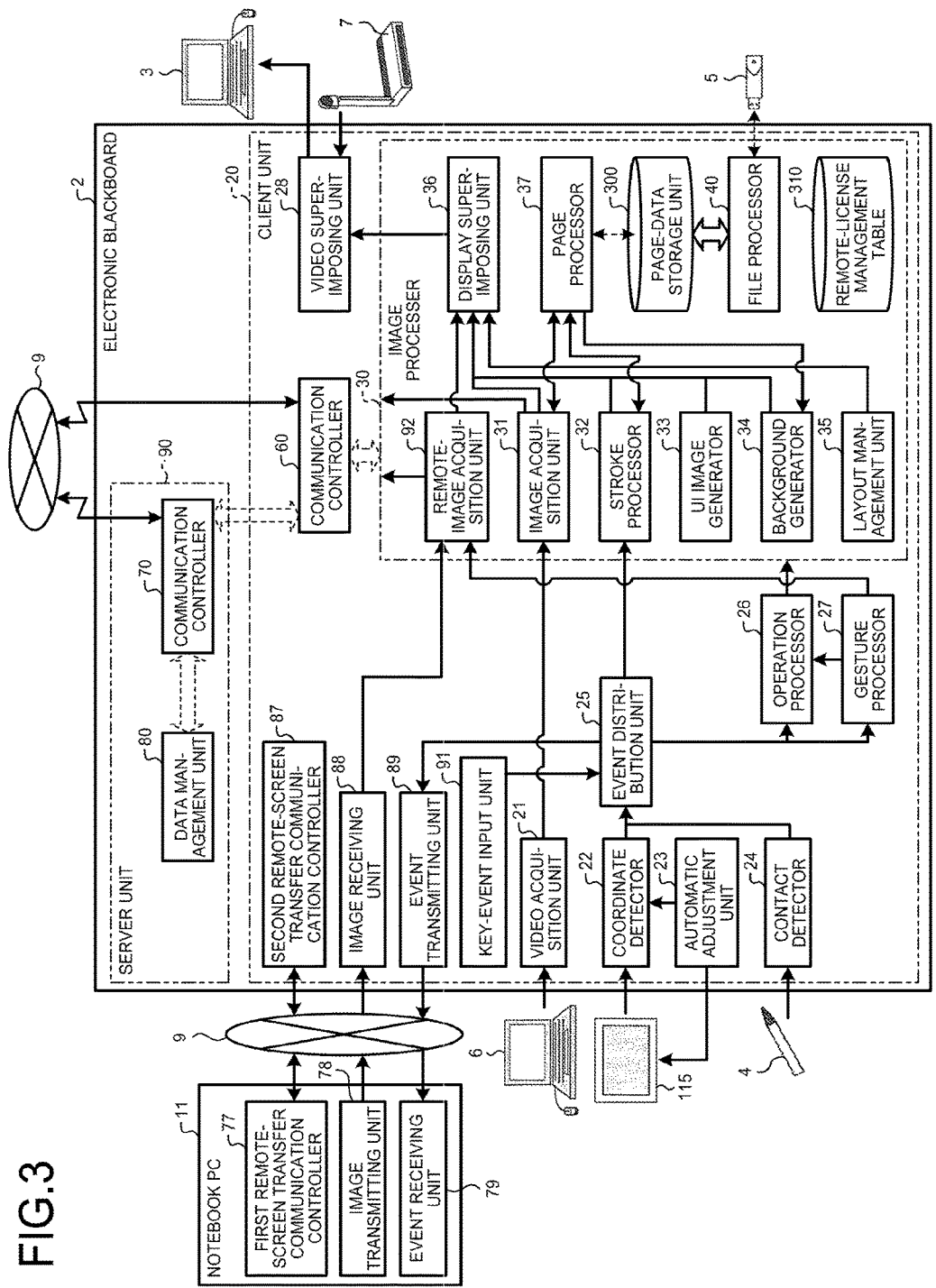
FIG. 3 is a functional block diagram of the electronic blackboard and a notebook PC.

The notebook PC 11 is connected to the communication network 9 in a wireless manner (or in a wired manner). The notebook PC 11 includes, as illustrated in FIG. 3, a first remote-screen transfer communication controller 77 as a first communication controller, an image transmitting unit 78, and an event receiving unit 79. As for the notebook PC 11, a general notebook PC provided with a communication function is used. The first remote-screen transfer communication controller 77 is the one to control communication performed between the notebook PC 11 and the electronic blackboard 2a (2b) via the communication network 9. The first remote-screen transfer communication controller 77 performs later-described processing for connection establishment (including connection authentication processing) with a second remote-screen transfer communication controller 87 of a later-described client unit (a client device) 20, and when the connection is established, instructs the image transmitting unit 78 to transfer image data (for example, data of an image displayed on the screen of the notebook PC 11) to the electronic blackboard (the client unit). The detail of the processing for connection establishment performed between the first remote-screen transfer communication controller 77 and the later-described second remote-screen transfer communication controller 87 of the electronic blackboard 2a (2b) will be described later.

The image transmitting unit 78 transmits the data of the image instructed by the first remote-screen transfer communication controller 77 to the electronic blackboard 2a (2b).

The event receiving unit 79 receives information on a mouse event or a keyboard event from a later-described event transmitting unit 89 of the electronic blackboard 2a (2b). The operation corresponding to the received information on the event is to be performed by an operating system (OS) of the notebook PC 11.

In the image processing system 1 of the above-described configuration, two of the electronic blackboards 2a and 2b communicate with each other via the communication network 9, and thereby an image drawn on the display 3a of the electronic blackboard 2a can be displayed on the display 3b of the electronic blackboard 2b, for example. Furthermore, an image drawn on the display 3b of the electronic blackboard 2b can also be displayed on the display 3a of the electronic blackboard 2a. As just described, in the image processing system 1, remote sharing processing in which the same image is shared between the two far apart electronic blackboards 2a and 2b can be performed. The detail of the remote sharing processing performed in the image processing system 1 will be described later.

In the following description, when any desired electronic blackboard out of a plurality of electronic blackboards is indicated, it is described simply as "electronic blackboard 2". In the same manner, "display 3", "electronic pen 4", "USB memory 5", "notebook PC 6", "TV conference terminal 7", "hand H", and "cable 10" are described.

Hardware Configuration of Electronic Blackboard 2

Next, the hardware configuration of the electronic blackboard 2 will be described.

Figure 2:
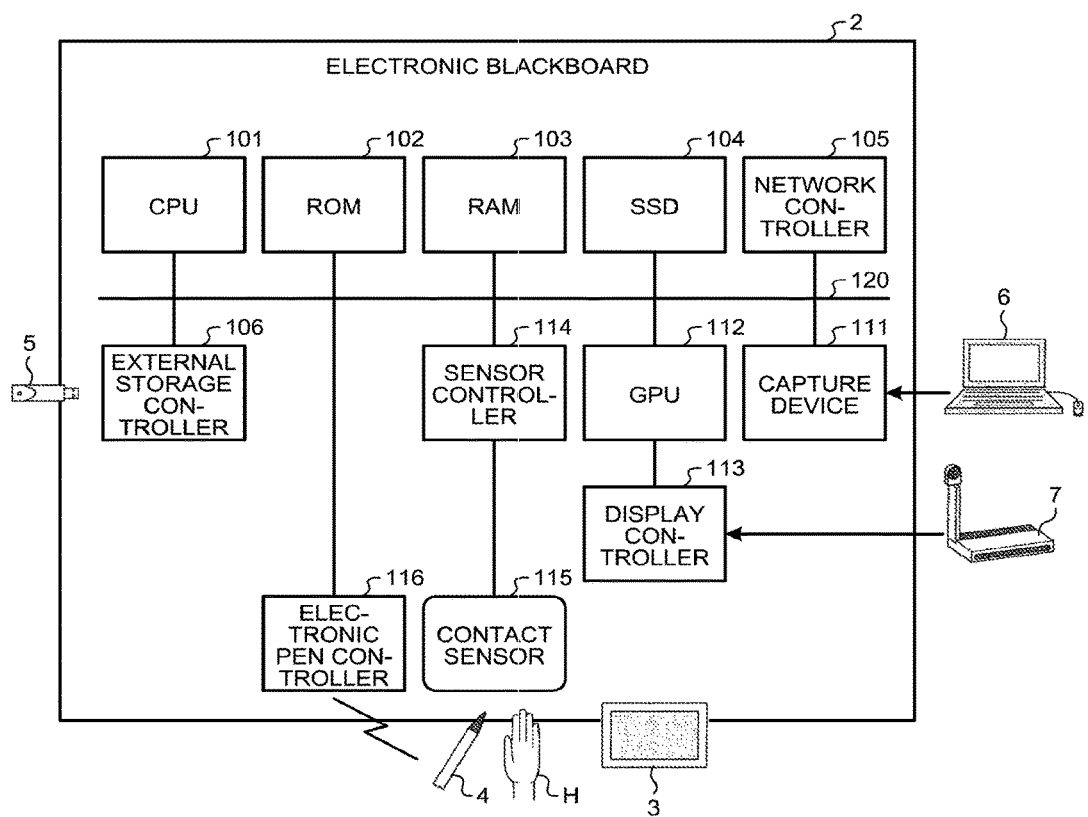
FIG. 2 is a hardware configuration diagram of an electronic blackboard.

In FIG. 2, the hardware configuration of the electronic blackboard 2 is illustrated. The electronic blackboard 2 includes a CPU 101 that controls overall operation of the electronic blackboard; a ROM 102 that stores therein computer programs such as an initial program loader (IPL) used to drive the CPU 101; a RAM 103 used as a work area of the CPU 101; a solid state drive (SSD) 104 in which a variety of data such as computer programs is stored; a network controller 105 that controls communication with other electronic blackboards and others via the communication network 9 (see FIG. 1); an external storage controller 106 that controls communication with the USB memory 5 that is connected to the display 3; a capture device 111 that displays, on the display of the notebook PC 6, video information as a still image or a moving picture; a graphics processing unit (GPU) 112 that performs image data processing necessary for graphics; a display controller 113 that performs control and management of screen display to display an output image from the GPU 112 on the display 3, the TV conference terminal 7, and the like; a contact sensor 115 that detects a contact (a touch) of the electronic pen 4, the hand H of the user, and the like on the display 3; a sensor controller 114 that controls the contact sensor 115; and an electronic pen controller 116 that performs communication with the electronic pen 4 and detects the touch on the display 3.

Of the foregoing various constituent units, the CPU 101, the ROM 102, the RAM 103, the SSD 104, the network controller 105, the external storage controller 106, the capture device 111, the GPU 112, the sensor controller 114, and the electronic pen controller 116 are connected to a bus line 120, such as an address bus and a data bus, for electrical connection.

The contact sensor 115 is a type of touch panel that detects an input operation performed on the display 3 with the electronic pen 4 and the like and detects the position coordinates thereof, by an infrared scanning method (also referred to as an infrared interruption detection method). In the infrared interruption detection method, two light emitting and receiving devices (not depicted) disposed at both end portions on the upper side of the display 3 emit a plurality of infrared rays in parallel with the screen, and receive light reflected on reflection members disposed on the peripheries of the screen. When the electronic pen 4 and the like come in contact with the screen, the light path of a single infrared ray each emitted by the two light emitting and receiving devices is interrupted and those interruptions of the infrared rays are detected by the two light emitting and receiving devices. The contact sensor 115 identifies the interrupted infrared ray and outputs the identification (ID) thereof to the sensor controller 114. The sensor controller 114 identifies the contact (i.e., input operation) of the electronic pen 4 and the like on the screen and identifies the position coordinates thereof, by using the received ID.

As the detection method of the contact sensor 115, it is not limited to the infrared interruption detection method, and various detection methods may be employed such as use of a capacitive touch panel that identifies an input operation and the position coordinates thereof by detecting the changes in capacitance, a resistive touch panel that detects the changes in voltage of two opposing resistive films, an electromagnetic inductive touch panel that detects electromagnetic induction that arises between a dedicated electronic pen and the screen, and others.

While the electronic pen controller 116 is configured to detect the presence of touch on the display 3 with the pen tip and pen top of the electronic pen 4, it is not limited to this and it may be configured to further detect the presence of touch with a grip portion and other portions.

Various types of data such as the computer programs stored in the SSD 104 may be configured to be stored (recorded) in an information recording medium such as a CD-ROM.

Functional Configuration of Electronic Blackboard 2

Next, the functional configuration of the electronic blackboard 2 will be described. The electronic blackboard 2 becomes a "host device" that first starts remote sharing processing, and becomes also a "participation device" that later participates in remote sharing processing that has already been started.

In FIG. 3, the functional configuration of a whole of the electronic blackboard 2 is illustrated. The functions of the electronic blackboard 2 are broadly divided into a client unit (a client device) 20 and a server unit (a server) 90. These functions are implemented by the constituent units in the foregoing hardware configuration and by various computer programs. The server unit 90 hosts remote sharing processing by providing service such as information necessary in the remote sharing processing to the client unit 20 via the communication network 9. Meanwhile, the client unit 20 participates in the remote sharing processing by receiving the service concerning the remote sharing processing from the server unit 90.

The electronic blackboard 2 in the embodiment is provided with both functions of the client unit 20 and the server unit 90. Consequently, both of the electronic blackboards 2a and 2b constituting the image processing system 1 can be a participation device and can be a host device. However, while both functions of the client unit 20 and the server unit 90 are activated in the electronic blackboard 2 that becomes a host device, only the client unit 20 is activated in the electronic blackboard 2 that becomes a participation device.

Consequently, when the electronic blackboard 2a is the host device and the electronic blackboard 2b is the participation device, for example, in the remote sharing processing, the server unit 90 in the electronic blackboard 2a provides the service concerning the processing, and the client unit 20 in the electronic blackboard 2a performs communication with the client unit 20 of the electronic blackboard 2b via the server unit 90 of the same electronic blackboard 2a, and the client unit 20 of the electronic blackboard 2b performs communication with the client unit 20 of the electronic blackboard 2a via the server unit 90 of the electronic blackboard 2a.

Functional Configuration of Client Unit 20

Next, the functional configuration of the client unit 20 will be described. The client unit 20 includes a video acquisition unit 21, a coordinate detector 22, an automatic adjustment unit 23, a contact detector 24, a key-event input unit 91, an event distribution unit 25 as an event acquisition unit, an operation processor 26, a gesture processor 27, a video superimposing unit 28, an image processor 30, and a communication controller 60. In addition to these, the client unit 20 includes also a portion that concerns the communication performed with an information processing apparatus connected to the communication network 9 without being connected to the other electronic blackboards, such as the notebook PC 11 illustrated in FIG. 3. Such a portion includes the second remote-screen transfer communication controller 87 as a second communication controller (and a communication controller), an image receiving unit 88 as an image data receiving unit, and the event transmitting unit 89.

The video acquisition unit 21 acquires an output video (an image signal) from a video output device such as the notebook PC 6 connected to the electronic blackboard 2 via the cable 10. Furthermore, the video acquisition unit 21 analyzes the acquired image signal and extracts image information such as the resolution of a display image (an image frame) of the video output device, the frequency of update, and others. The acquired image signal and image information are output to the image processor 30 (an image acquisition unit 31), which will be described later.

The coordinate detector 22 detects the position coordinates of an event generated by the user (a touch and others on the display 3 with the pen tip or pen top of the electronic pen 4). The coordinate detector 22 further detects the size of the touched area on the display 3. These detection results are output to the event distribution unit 25.

The automatic adjustment unit 23 is activated at the time of starting up the electronic blackboard 2, and adjusts various parameters of signal processing and others in the infrared scanning method of the contact sensor 115 so that the coordinate detector 22 can detect the position coordinates of an event such as a touch with an adequate resolution.

The contact detector 24 detects an event generated by the user (a touch and the like on the display 3 with the pen tip or pen bottom of the electronic pen 4). The detection result is output to the event distribution unit 25.

The key-event input unit 91, when the user performed an input operation on a keyboard displayed on the display 3 of the electronic blackboard 2, detects a keyboard event generated by the input operation. The keyboard event detected by the key-event input unit 91 is output to the event distribution unit 25.

The event distribution unit 25 determines which of the electronic blackboard 2 and an external device (the notebook PC 11, in this embodiment) that is connected via the communication network 9 is set as an operation target device. In practice, when a mouse input (a touch input of the electronic pen 4 and an input by the hand H) or a keyboard input is performed, a button for setting (or a button for selecting) the operation target device is displayed on the screen of the display 3 and the user clicks the button with the electronic pen 4, for example, and thereby the setting of the operation target device is performed. The event distribution unit 25 recognizes the setting of operation target device based on the detection results of the coordinate detector 22 and the contact detector 24. Because the mouse input or keyboard input by the user is performed in a state that the operation target device has been set, a designating command of the target device may be included in a part of the mouse input or keyboard input. In any event, when the event distribution unit 25 determines that the notebook PC 11 (an information processing apparatus) is set as the operation target device, the event distribution unit 25 sends information on the mouse event (each event of stroke drawing, UI operation, and gesture operation corresponding to the mouse input) or keyboard event to the event transmitting unit 89 (see FIG. 20A and FIG. 20B).

Meanwhile, when the event distribution unit 25 determines that the electronic blackboard 2 is set as the operation target device, the event distribution unit 25 sends the information on the mouse event or keyboard event to any of the operation processor 26, the gesture processor 27, and a stroke processor 32. In more detail, the event distribution unit 25 determines the type of input event based on the position coordinates of an event detected by the coordinate detector 22, the detection result detected by the contact detector 24, and a keyboard event from the key-event input unit 91. Specifically, the event distribution unit 25 determines which of stroke drawing, a UI operation, and a gesture operation is the input event, and depending on the determination result, distributes and outputs information on the event to any of the image processor 30 (the stroke processor 32), the operation processor 26, and the gesture processor 27.

The stroke drawing, when a later-described stroke image (B) is being displayed on the display 3, is an event to draw a stroke on the display 3 by the user pressing down the electronic pen 4 onto the display 3, sliding the electronic pen 4 in that state on the display 3, and lastly separating the electronic pen 4 from the display 3. The stroke drawing not only includes drawing a stroke but also includes an event to delete a stroke that has already been drawn and an event to edit a drawn stroke.

The UI operation, when a later-described UI image (A) is being displayed on the display 3, is an event that the user presses down a certain position with the electronic pen 4, the hand H, and others. By the UI operation, the color, width, and others of a line drawn by the electronic pen 4 are set, for example. By the UI operation, the setting of the foregoing operation target device and others is also performed.

The gesture operation, when the later-described stroke image (B) is being displayed on the display 3, is an event that the user performs such gestures as flick, swipe, and pinch (in/out) by touching the display 3 with the hand H and sliding it. By the gesture operation, the expansion (or reduction) of an image, changes of the display area, or switching of pages can be performed, for example.

The operation processor 26 receives information on an event determined to be a UI operation by the event distribution unit 25, and performs the above-described various operations depending on the element of the UI that caused the event. The elements of the UI include buttons (including the foregoing button for setting an operation target device), lists, check boxes, and text boxes, for example.

The gesture processor 27 receives the information on the event determined to be a gesture operation by the event distribution unit 25, and performs the operation (expansion or reduction of an image, changes of the display area, or switching of pages) corresponding to the information.

The video superimposing unit 28 displays on the display 3 an image that has been superimposed (laid out) by the later-described image processor 30 (a display superimposing unit 36). Furthermore, the video superimposing unit 28 displays a video sent from a video output device (the notebook PC 6 and others) via the image processor 30 on a whole of the display 3, and separately displays a video sent from other video output devices (the TV conference terminal 7 and others) on a part of the display 3 (referred to as picture-in-picture). The video superimposing unit 28 further performs switching to the display that displays the display of picture-in-picture on the whole of the display 3.

The second remote-screen transfer communication controller 87 performs processing for connection establishment including connection authentication processing with the first remote-screen transfer communication controller 77 of the notebook PC 11 connected via the communication network 9. The processing for connection establishment will be described later.

The image receiving unit 88 receives image data transmitted, via the communication network 9, from the image transmitting unit 78 of the notebook PC 11 for which the connection with the electronic blackboard 2 has been established. As the image data in this case, the data of an image displayed on the screen of the notebook PC 11 is typically conceivable, for example. The image receiving unit 88 sends the received image data to a later-described remote-image acquisition unit 92 of the image processor 30.

Figure 20A:
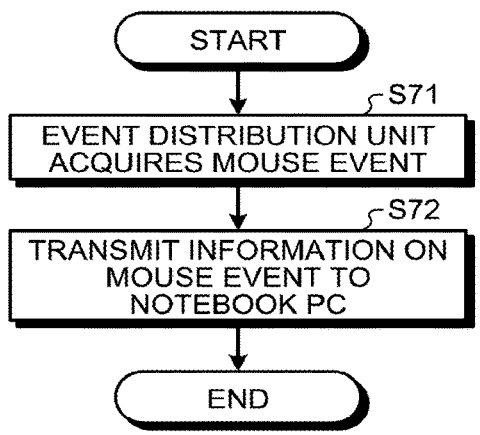
FIG. 20A is a diagram for explaining the processing of performing a mouse operation of the notebook PC by remote operation from the electronic blackboard side.

The event transmitting unit 89, as illustrated at Step S72 in FIG. 20A, transmits the information on a mouse event received from the event distribution unit 25, to the event receiving unit 79 of the notebook PC 11. Furthermore, the event transmitting unit 89, as illustrated at Step S74 in FIG. 20B, transmits the information on a keyboard event received from the event distribution unit 25, to the event receiving unit 79 of the notebook PC 11. Consequently, by the OS of the notebook PC 11, the mouse operation or keyboard operation corresponding to the information on the event received on the screen is performed.

Image Processor 30

The image processor 30 performs processing of superimposing images (image layers), and others. The image processor 30 includes the image acquisition unit 31, the stroke processor 32, a UI image generator 33, a background generator 34, a layout management unit 35, the remote-image acquisition unit 92, the display superimposing unit 36, a page processor 37, a page-data storage unit 300, a remote-license management table 310, and a file processor 40.

The image acquisition unit 31 acquires, from an output video acquired by the video acquisition unit 21, each frame included therein as an image and outputs it to the display superimposing unit 36. This image corresponds to an output image (C) from a video output device (the notebook PC 6 and others) illustrated in FIG. 4.

The stroke processor 32 receives the information on an event that is determined to be stroke drawing (drawing by a stroke using the electronic pen 4 or the hand H) by the event distribution unit 25; draws, deletes, and edits an image (a stroke image) by the stroke; and outputs the image data thereof and stroke data to the display superimposing unit 36 and the page processor 37. The image drawn by the stroke corresponds to the stroke image (B) illustrated in FIG. 4. The respective results of the drawing, deleting, and editing of the stroke image are stored in an operation-data storage unit 840 (see FIG. 15) as operation data.

The UI image generator 33 generates a user interface (UI) image that is preset in the electronic blackboard 2 and outputs it to the display superimposing unit 36. This UI image corresponds to the UI image (A) illustrated in FIG. 4.

The background generator 34 receives, from the page processor 37, media data included in page data that the page processor 37 read out from the page-data storage unit 300. The background generator 34 outputs the received media data to the display superimposing unit 36. The image by the media data corresponds to a background image (D) illustrated in FIG. 4. The patterns of the background image (D) are blank, grid display, and others.

The layout management unit 35 manages information that concerns layout (layout information) which specifies how the output image (C) and the stroke image (B) output from the image acquisition unit 31 and the stroke processor 32 are laid out (are displayed at which positions) against the UI image (A) and the background image (D) output from the UI image generator 33 and the background generator 34, or which specifies them to be non-display. That layout information is output to the display superimposing unit 36.

The remote-image acquisition unit 92 acquires, as an image, each frame from the output video acquired by the image receiving unit 88 and outputs it to the display superimposing unit 36, which will be described later. This image corresponds to an output image (see (C) in FIG. 4) from an information processing apparatus (the notebook PC 11 and others).

The display superimposing unit 36, in accordance with the layout information output from the layout management unit 35, lays out the UI image (A) output from the UI image generator 33, the stroke image (B) output from the stroke processor 32, the output image (C) output from the image acquisition unit 31 or the remote-image acquisition unit 92, and the background image (D) output from the background generator 34, and displays them in sequence on the first to fourth display panels (layers), respectively, from the near side (user side) of the display 3. Consequently, the four images are, as illustrated in FIG. 4, displayed being overlapped in order of the UI image (A), the stroke image (B), the output image (C), and the background image (D) from the user side.

The display superimposing unit 36 can also turn each of the output image (C) and the background image (D) into non-display as appropriate in accordance with the layout information output from the layout management unit 35. For example, when the connection of the video output device (the notebook PC 6 and others) is lost, the display superimposing unit 36 turns the output image (C) into non-display and displays the UI image (A), the stroke image (B) and the background image (D) on the first, second, and fourth display panels (layers), respectively, from the near side (user side) of the display 3. Consequently, the three images are displayed being overlapped in order of the UI image (A), the stroke image (B), and the background image (D) from the user side. The display superimposing unit 36 further performs the processing of expansion, reduction, and move of the display area of an image. The processing of expanding and displaying an image transmitted from the notebook PC 11 on the display 3 will be described later.

The page processor 37 puts the data of the stroke image (B) and the data of the output image (C) together into a single piece of page data and stores it in the page-data storage unit 300. The data of the stroke image (B) constitutes a part of the page data as stroke arrangement data (each piece of stroke data) that is indicated by stroke-arrangement data ID illustrated in FIG. 5. The data of the output image (C) constitutes a part of the page data as media data that is indicated by media data ID illustrated in FIG. 5. The media data is handled as the data of the background image (D) when it is read out from the page-data storage unit 300.

The page processor 37 transmits the media data out of the page data once stored to the display superimposing unit 36 via the background generator 34, and thereby the video superimposing unit 28 can refresh the display of the background image (D) on the display 3. The page processor 37 returns the stroke arrangement data (each piece of stroke data) out of the page data to the stroke processor 32, and thereby is able to cause the stroke to be in a state that re-editing can be performed. Moreover, the page processor 37 can also delete and copy the page data.

That is, at the time the page processor 37 stores the page data in the page-data storage unit 300, the data of the output image (C) displayed on the display 3 is stored once in the page-data storage unit 300, and when it is read out from the page-data storage unit 300 subsequently, it is read out as the media data indicative of the background image (D). The page processor 37 then outputs, out of the page data read out from the page-data storage unit 300, the stroke arrangement data indicative of the stroke image (B) to the stroke processor 32. The page processor 37 further outputs, out of the page data read out from the page-data storage unit 300, the media data indicative of the background image (D) to the background generator 34.

In FIG. 5, one example of the page data is illustrated. The page data is the data for a single page displayed on the display 3, that is, the stroke arrangement data (each piece of stroke data) to display the stroke image (B) on the display 3 and the media data to display the background image (D) on the display 3. The page data includes a page data ID that identifies the page; the time that the display of that page started (a start time); the time that the updating of the page data ended by a stroke, a gesture, and the like (an end time); a stroke-arrangement data ID that identifies the stroke arrangement data generated by a stroke by using the electronic pen 4, the hand H, and others; and a media data ID that identifies the media data.

In FIG. 6, one example of the stroke arrangement data is illustrated. A single piece of stroke arrangement data is composed of a plurality of pieces of stroke data. The stroke data is generated for each stroke drawn by using the electronic pen 4. Consequently, when drawing an alphabet "S", one stroke is required, and thus that stroke image is reproduced by a single piece of stroke data. When drawing an alphabet "T", two strokes are required, and thus that stroke image is reproduced by two pieces of stroke data.

Each piece of stroke data is composed of a stroke data ID that identifies that stroke data, the time of the start of drawing that stroke (a start time) and the time of the end of drawing (an end time), the color and width of the stroke, and a coordinate arrangement data ID that identifies coordinate arrangement data including information concerning pass points.

Figures 7, 8, 9:
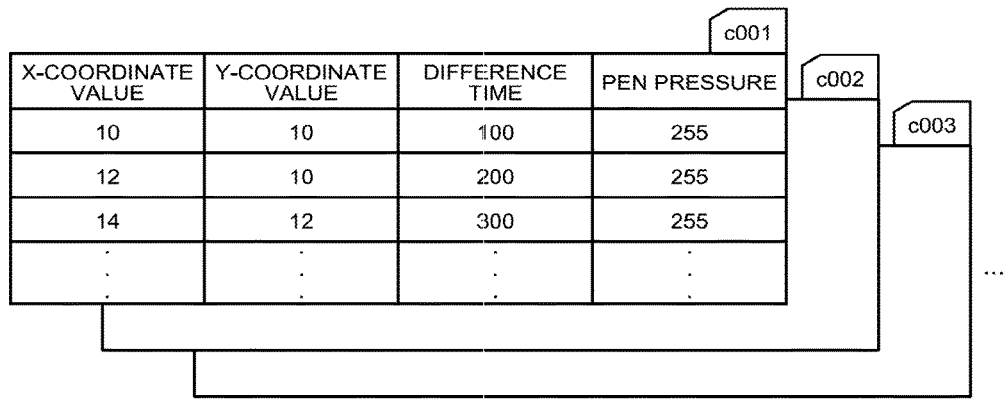
FIG. 7 is a conceptual diagram illustrating coordinate arrangement data.
FIG. 8 is a conceptual diagram illustrating media data.
FIG. 9 is a conceptual diagram illustrating a remote-license management table.

In FIG. 7, one example of the coordinate arrangement data is illustrated. The coordinate arrangement data includes, corresponding to one stroke, information concerning a plurality of pass points that the stroke has passed from the start to the end of the stroke at regular time intervals. The coordinate data is composed of a position coordinates (an X coordinate and a Y coordinate) on the display 3, the time (difference time with respect to the start time of the stroke) that the stroke passed the point of the position coordinates, and the pen pressure of the electronic pen 4.

In FIG. 8, one example of the media data is illustrated. The media data is the data concerning the information on images (the stroke image (B) and the background image (D)) displayed on the display 3 at the time of recording the page data and includes a type of data, recorded time, data concerning the layout of images (referred to as layout data), and data content. For example, when the background image (D) is not displayed on the display 3 and only the stroke image (B) is displayed, only the data of that stroke image (B) is included in the media data, and when both the background image (D) and the stroke image (B) are displayed on the display 3, the data of both is included in the media data.

Referring back to FIG. 3, the remote-license management table 310 manages license data necessary for performing remote sharing processing. In FIG. 9, one example of the remote-license management table is illustrated. The remote-license management table is composed of a product ID of the electronic blackboard 2, a license ID used for authentication, and the expiry date of license.

Functional Configuration of File Processor 40

Next, the functional configuration of the file processor 40 will be described.

Figure 10:
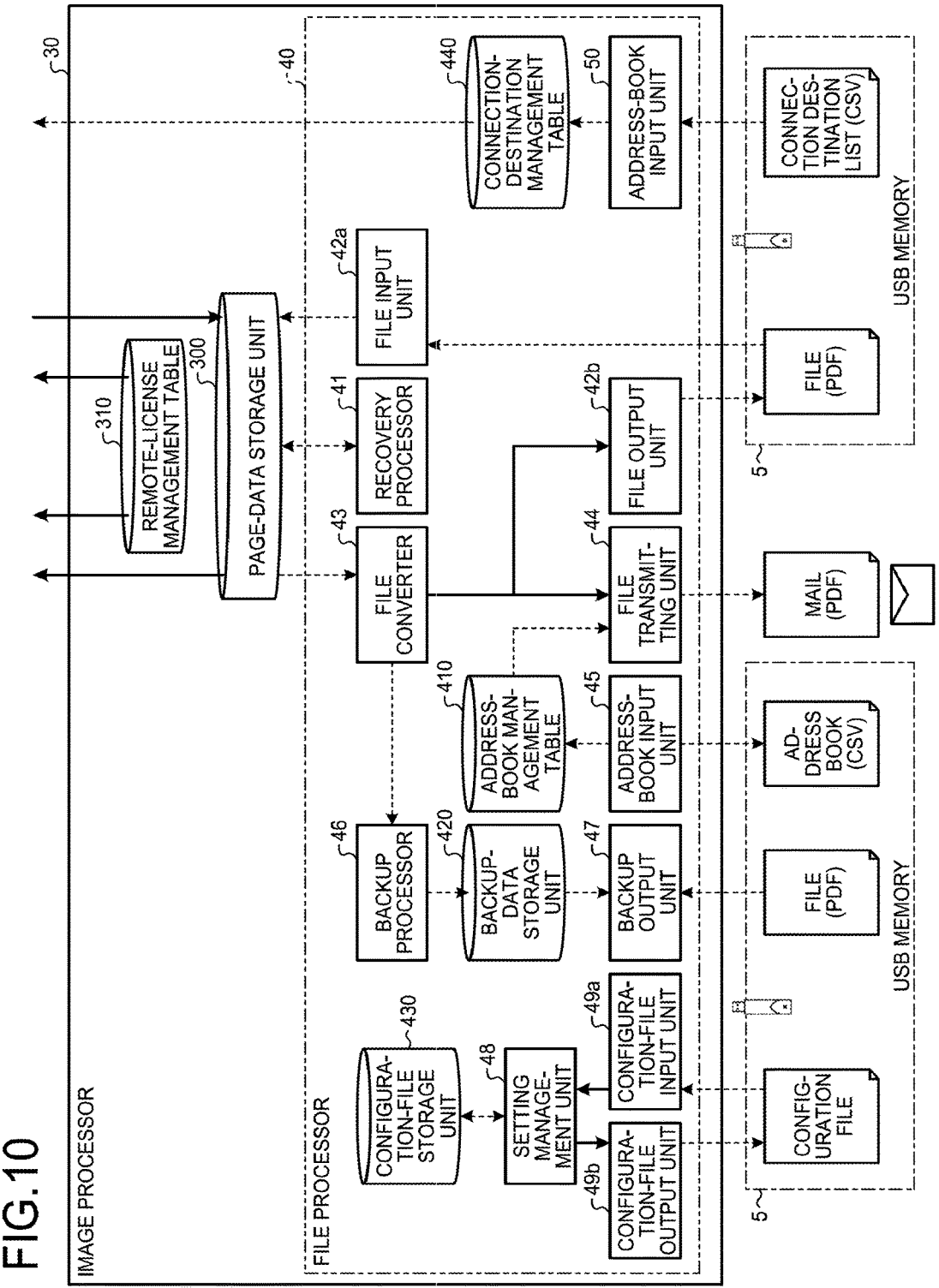
FIG. 10 is a functional block diagram of a file processor.

In FIG. 10, the functional configuration of the file processor 40 is illustrated. The file processor 40 includes a recovery processor 41, a file converter 43, a file input unit 42a, a file output unit 42b, a file transmitting unit 44, an address-book input unit 45, a backup processor 46, a backup output unit 47, a setting management unit 48, a configuration-file output unit 49b, a configuration-file input unit 49a, and an address-book input unit 50. The file processor 40 further includes an address-book management table 410, a backup-data storage unit 420, a configuration-file storage unit 430, and a connection-destination management table 440, which store and manage various types of data.

The recovery processor 41, when the electronic blackboard 2 is abnormally terminated by the interruption of power and others, detects that abnormal termination and restores unsaved page data. Even when the electronic blackboard 2 is abnormally terminated, the page data has been stored and remains in the page-data storage unit 300. Consequently, the recovery processor 41, when the power is turned on, restores the page data by reading it out from the page-data storage unit 300.

The file converter 43 reads out the page data (see FIG. 5) stored in units of pages in the page-data storage unit 300 and converts it into a PDF file. When a plurality of pieces of page data are stored in the page-data storage unit 300, they are converted individually into a plurality of PDF files (that is, in units of pages) or converted into a single PDF file in a lump. The converted PDF file is output to the backup processor 46.

The file input unit 42a reads in a PDF file from the USB memory 5, takes in (converts), as the page data, the respective data of the stroke image (B) and the background image (D) stored in units of pages, and the layout data (see FIG. 8), and stores the page data in the page-data storage unit 300. When a plurality of PDF files are stored in the USB memory 5, the page data on all of them is taken in.

The file output unit 42b stores in the USB memory 5 the PDF file output from the file converter 43.

The file transmitting unit 44 transmits the PDF file output from the file converter 43 by attaching it to e-mail. The destination of the e-mail (e-mail addresses) is managed in the address-book management table 410. In FIG. 11, one example of the address-book management table 410 is illustrated. In the address-book management table 410, the name of an addressee and the e-mail address are put together being associated with each other. The content of the address-book management table 410 is displayed on the display 3 by the display superimposing unit 36, and the user selects the e-mail address of a destination by looking at the display and operating an input device such as a touch panel. The user can also input the e-mail address of the destination by operating the input device such as a touch panel. The file transmitting unit 44 determines the selected or input e-mail address to be the destination.

The address-book input unit 45 reads in an address book (for example, an electronic file in CSV format) that is a list of e-mail addresses from the USB memory 5, and stores the content in the address-book management table 410.

The backup processor 46 performs backup by receiving a PDF file from the file converter 43 and storing it in the backup data storage unit 420. In FIG. 12, one example of backup data is illustrated. The backup data is stored as a file in PDF format (PDF file). This backup processing is performed when the backup is set by the user, and is not performed when not set.

The backup output unit 47 stores the PDF file stored in the backup data storage unit 420 in the USB memory 5. At the time of storing, for security, the user is required to input a password by operating the input device such as a touch panel. The PDF file stored in the USB memory 5 can be read by the foregoing file input unit 42a.

The setting management unit 48 manages various types of setting information on the electronic blackboard 2 by storing it in the configuration-file storage unit 430 and reading it out therefrom. The setting information on the electronic blackboard 2 includes information concerning network setting, time and date setting, region and language setting, mail server setting, address book setting, connection-destination list setting, and backup setting, for example. The network setting includes IP address setting, net mask setting, default gateway setting, and domain name system (DNS) setting of the electronic blackboard 2, for example.

The configuration-file output unit 49b stores the above-described various types of setting information on the electronic blackboard 2 in the USB memory 5 as a configuration file. By the security, the user is not allowed to see the content of the configuration file.

The configuration-file input unit 49a reads in the configuration file from the USB memory 5 and outputs the content thereof to the setting management unit 48. Consequently, the various types of setting information is reflected in the various settings of the electronic blackboard 2.

The address-book input unit 50 reads in a connection destination list (for example, an electronic file in CSV format) that is a list of destination IP addresses in remote sharing processing from the USB memory 5, and stores it in the connection-destination management table 440. The connection-destination management table 440 is a table that the IP addresses of the electronic blackboards 2 are stored in advance in order to save time for the user to input the IP address of a host device (an electronic blackboard 2 that has started the remote sharing processing) when the electronic blackboard 2 is a participation device (an electronic blackboard 2 that later participates in the remote sharing processing that has already been started).

In FIG. 13, one example of the connection-destination management table 440 is illustrated. In the connection-destination management table 440, the name (given by using the name of place that the electronic blackboard 2 is installed, in this example) of the electronic blackboard 2 that functions as a host device and the IP address are put together being associated with each other.

In place of using the connection-destination management table 440, it may be configured such that the user of a participation device inputs one by one the IP address of the host device by operating the input device such as a touch panel. In this case, the user of the participation device needs to know the IP address of the host device by telephone, e-mail, and others from the user of the host device.

Functional Configuration of Communication Controller 60

Next, the functional configuration of the communication controller 60 will be described.

Figure 15:
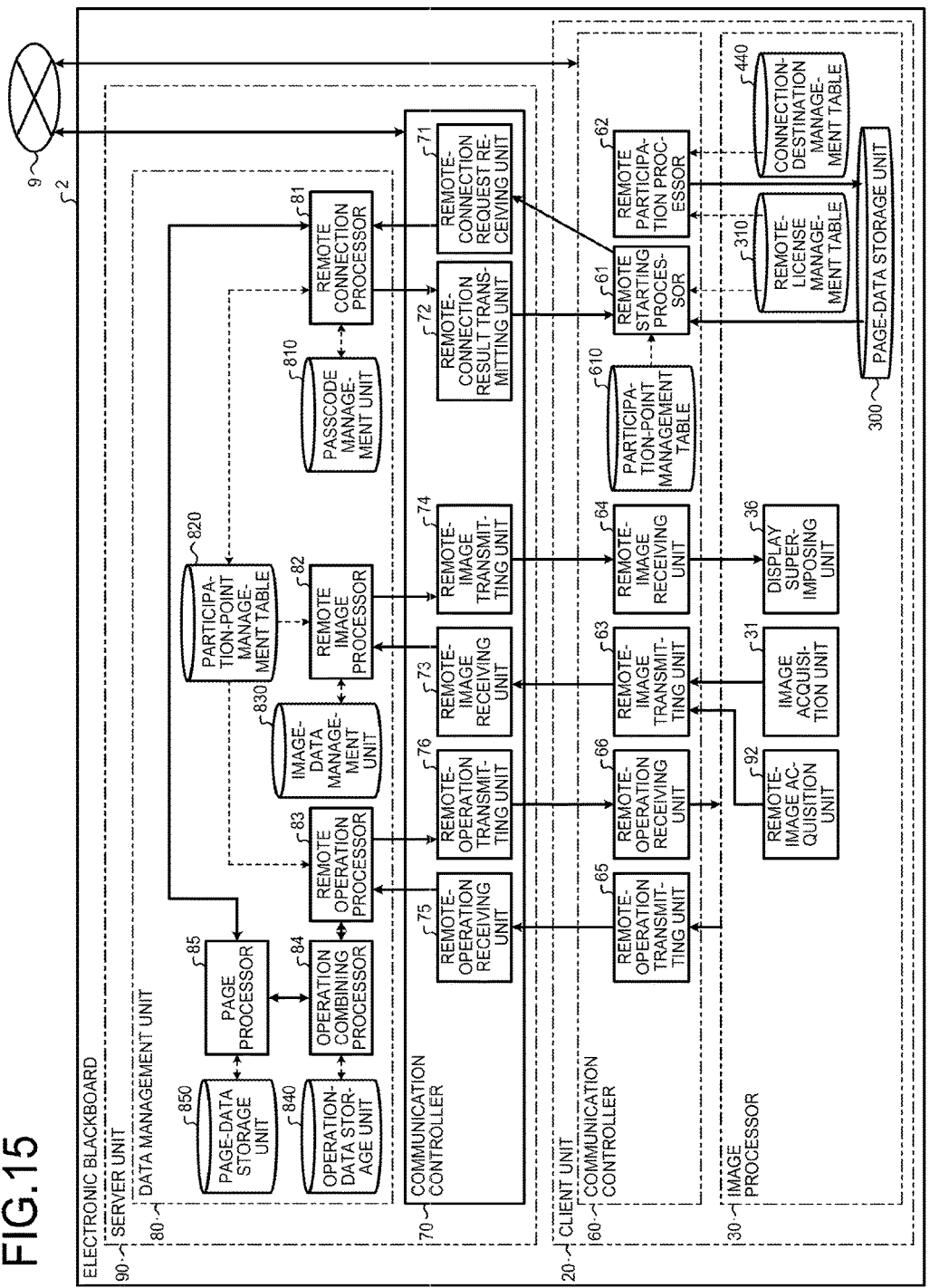
FIG. 15 is a functional block diagram of communication controllers of a server unit and a client unit.

In FIG. 15, the functional configuration of the communication controller 60 is illustrated together with the functional configuration of the server unit 90. The communication controller 60 controls the communication performed with the other electronic blackboard 2 via the communication network 9. The communication controller 60, as illustrated in FIG. 15, includes a remote starting processor 61, a remote participation processor 62, a remote-image transmitting unit 63, a remote-image receiving unit 64, a remote-operation transmitting unit 65, a remote-operation receiving unit 66, and a participation-point management table 610.

The remote starting processor 61 requests the later-described server unit 90 to newly start remote sharing processing and receives the result of the request from the server unit 90. Prior to the request, the remote starting processor 61 refers to the remote-license management table 310 and checks whether the license information (the product ID of the electronic blackboard 2, the license ID, and the expiry date of license) is managed. The remote starting processor 61 requests the starting of the remote sharing processing only when the license information is managed, and does not request it when not managed.

The remote participation processor 62, via the communication network 9, requests the participation in the remote sharing processing from the server unit 90 (a remote-connection request receiving unit 71) of the host device (the electronic blackboard 2 that has started the remote sharing processing) and receives the result of the request from the server unit 90. Prior to the request, the remote participation processor 62 refers to the remote-license management table 310. The remote participation processor 62 further refers to the connection-destination management table 440 and acquires the IP address of the host device. In place of the remote participation processor 62 referring to the connection-destination management table 440, it may be configured such that the user inputs one by one the IP address of the host device by operating the input device such as a touch panel.

The remote-image transmitting unit 63 transmits the output image (C) sent from the video acquisition unit 21 (see FIG. 3) or the image receiving unit 88 (see FIG. 3) via the image acquisition unit 31 or the remote-image acquisition unit 92, respectively, to the server unit 90 (a remote-image receiving unit 73).

The remote-image receiving unit 64 receives an output image (an image signal) from a video output device connected to the other electronic blackboard 2 from the server unit 90 (a remote-image transmitting unit 74), and outputs it to the display superimposing unit 36. Consequently, the remote sharing processing can be performed.

The remote-operation transmitting unit 65 transmits various types of operation data necessary for the remote sharing processing to the server unit 90 (a remote-operation receiving unit 75). The various types of operation data includes the data concerning the addition of stroke, deletion of stroke, editing (expansion, reduction, move) of stroke, storage of page data, creation of page data, copying of page data, deletion of page data, and switching of displayed page, for example.

The remote-operation receiving unit 66 receives, from the server unit 90 (a remote-operation transmitting unit 76), the operation data input in the other electronic blackboard 2 and outputs it to the image processor 30. Consequently, the remote sharing processing is performed.

The participation-point management table 610, when the electronic blackboard is the host device, is a table to manage, as the participation devices, the electronic blackboards that are currently participating in the remote sharing processing. In FIG. 14, one example of the participation-point management table 610 is illustrated. In the participation-point management table 610, the name (given by using the name of place that the electronic blackboard 2 is installed, in this example) of the electronic blackboard 2 that is a participation device and the IP address are put together being associated with each other.

Functional Configuration of Server Unit 90

Next, the functional configuration of the server unit 90 will be described. In the embodiment, all of the electronic blackboards 2 are provided with the server unit 90, and any of the electronic blackboards 2 can exercise the function of the server unit 90. As apparent from FIG. 15, the server unit 90 includes, as broadly divided, a communication controller 70 and a data management unit 80.

Functional Configuration of Communication Controller 70

First, the functional configuration of the communication controller 70 will be described. The communication controller 70 controls the communication with the communication controller 60 that is in the client unit 20 of the electronic blackboard 2, and the communication with the communication controller 60 that is in the client unit 20 of the other electronic blackboard 2 via the communication network 9. The communication controller 70 includes the remote-connection request receiving unit 71, a remote-connection result transmitting unit 72, the remote-image receiving unit 73, the remote-image transmitting unit 74, the remote-operation receiving unit 75, and the remote-operation transmitting unit 76.

The remote-connection request receiving unit 71 receives a starting request of remote sharing processing from the remote starting processor 61, and receives a request for participation in remote sharing processing from the remote participation processor 62 of the other electronic blackboard 2 via the communication network 9. The remote-connection result transmitting unit 72 transmits the result of the starting request of remote sharing processing to the remote starting processor 61, and transmits the result of the request for participation in remote sharing processing to the remote participation processor 62 of the other electronic blackboard 2 via the communication network 9.

The remote-image receiving unit 73 receives image data (output image (C)) from the remote-image transmitting unit 63 and transmits it to a later-described remote image processor 82. The remote-image transmitting unit 74 receives the image data from the remote image processor 82 and transmits it to the remote-image receiving unit 64.

The remote-operation receiving unit 75 receives operation data (data of the stroke image (B) and others) from the remote-operation transmitting unit 65 and transmits it to a later-described remote operation processor 83. The remote-operation transmitting unit 76 receives the operation data from the remote operation processor 83 and transmits it to the remote-operation receiving unit 66.

Functional Configuration of Data Management Unit 80

Next, the functional configuration of the data management unit 80 will be described. The data management unit 80 manages operation data, image data, and others. The data management unit 80 includes a remote connection processor 81, the remote image processor 82, the remote operation processor 83, an operation combining processor 84, and a page processor 85. The data management unit 80 further includes a passcode management unit 810, a participation-point management table 820, an image-data management unit 830, the operation-data storage unit 840, and a page-data storage unit 850, which store and manage a variety of data.

The remote connection processor 81 performs the start and termination of remote sharing processing. At the time of starting the remote sharing processing, the remote connection processor 81 determines whether to permit participation in the remote sharing processing of the other electronic blackboard 2. The remote connection processor 81 receives license information that the remote-connection request receiving unit 71 has received together with a starting request of remote sharing processing from the remote starting processor 61 or the license information that has been received together with a request for participation in remote sharing processing from the remote participation processor 62, and checks for the presence of license and the validity of the license. The remote connection processor 81 further checks whether the number of participation requests from the other electronic blackboards 2 exceeds the predetermined number of participants allowed. When the valid license is not present or when the number of participation requests exceeds the number of participants allowed, the remote connection processor 81 rejects the participation in the remote sharing processing.

The remote connection processor 81 further determines (authenticates) whether the passcode sent from the other electronic blackboard 2 together with the request for participation in remote sharing processing matches the passcode managed by the passcode management unit 810, and only when the passcodes match, it permits the participation in the remote sharing processing.

The passcode is issued by the remote connection processor 81 at the time of newly starting the remote sharing processing and is managed by the passcode management unit 810. The user of a participation device that participates in the remote sharing processing acquires the passcode from the user of the host device by telephone, e-mail, and others. The user of the participation device inputs the acquired passcode to the participation device, and thereby is able to request the participation in the remote sharing processing. By giving priority to the usability of the user over the security, only the license condition may be checked and the check for the passcode may be omitted.

At the time of starting the remote sharing processing, the remote connection processor 81 stores, in the participation-point management table 820, participation point information included in the participation request transmitted from the remote participation processor 62 of the participation device via the communication network 9. The remote connection processor 81 further reads out participation point information stored in the participation-point management table 820 and transmits the participation point information to the remote-connection result transmitting unit 72. The participation point information is transmitted to the remote starting processor 61, and is stored in the participation-point management table 610. Consequently, in the host device, the participation point management information on the same content is to be managed in both the client unit 20 and the server unit 90.

The remote image processor 82 receives image data (output image (C)) from the video output device (the notebook PC 6 and others (see FIG. 3)) connected to the client units 20 of the electronic blackboards 2 (including both the host device and the participation device) participating in the remote sharing processing and stores the data in the image-data management unit 830, and then determines, in accordance with the received time (time order), the order of display of the image data on which the remote sharing processing is performed. The remote image processor 82 further refers to the participation-point management table 820 and transmits, in accordance with the determined order of display, the image data to the client units 20 of all of the electronic blackboards 2 (including both the host device and the participation device) participating in the remote sharing processing via the communication controller 70 (the remote-image transmitting unit 74).

The remote operation processor 83 receives various types of operation data (the stroke image (B) and others) such as stroke images drawn in the client units 20 of the electronic blackboards 2 (including both the host device and the participation device) participating in the remote sharing processing, and determines the order of display of the images in accordance with the received time (time order). The various types of operation data are the same as the foregoing various types of operation data. The remote operation processor 83 further refers to the participation-point management table 820 and transmits the operation data to the client units 20 of all of the electronic blackboards 2 (including both the host device and the participation device) participating in the remote sharing processing.

The operation combining processor 84 combines the operation data of each of the electronic blackboards 2 output from the remote operation processor 83, and then stores the combined operation data in the operation-data storage unit 840 and returns the combined operation data to the remote operation processor 83. The operation data that has been returned to the remote operation processor 83 is transmitted to the respective client units 20 of the host device and the participation device via the remote-operation transmitting unit 76. Consequently, in each of the electronic blackboards 2, the same image concerning the operation data is displayed.

In FIG. 16, one example of the operation data is illustrated. In the operation data, the sequence (SEQ), name of operation, IP address of the electronic blackboard 2 of transmission source and port number of the client unit (the server unit), IP address of the electronic blackboard 2 of destination and port number of the client unit (the server unit), type of operation, target of operation, and data concerning the content of operation are put together being associated with one another. For example, in the operation data SEQ 1, it is indicated that a stroke was drawn in the client unit (Port No.: 50001) of an electronic blackboard (IP address: 192.0.0.1) that is a host device, and that the stroke data of operation type "stroke" and operation target "(page data ID) p005" was sent to the server unit (Port No.: 50000) of the electronic blackboard (IP address: 192.0.0.1) of the same host device. In the operation data SEQ 2, it is indicated that the stroke data was transmitted to the client unit (Port No.: 50001) of the other electronic blackboard (IP address: 192.0.0.2) that is a participation device from the server unit (Port No.: 50000) of the electronic blackboard (IP address: 192.0.0.1) that is the host device.

The operation combining processor 84 combines the operation data in order of input, and thus the stroke images (B) are displayed on the displays 3 of all of the electronic blackboards 2 participating in the remote sharing processing in order of strokes by the user in each electronic blackboard 2, as long as the communication network 9 is not congested.

The page processor 85 has the same function as that of the page processor 37 in the image processor 30 of the client unit 20, and stores in the page-data storage unit 850 the page data as illustrated in FIGS. 5 to 7. The page-data storage unit 850 is of the same content as that of the page-data storage unit 300 in the image processor 30, and thus its explanation is omitted.

Processing for Connection Establishment

Figure 17:
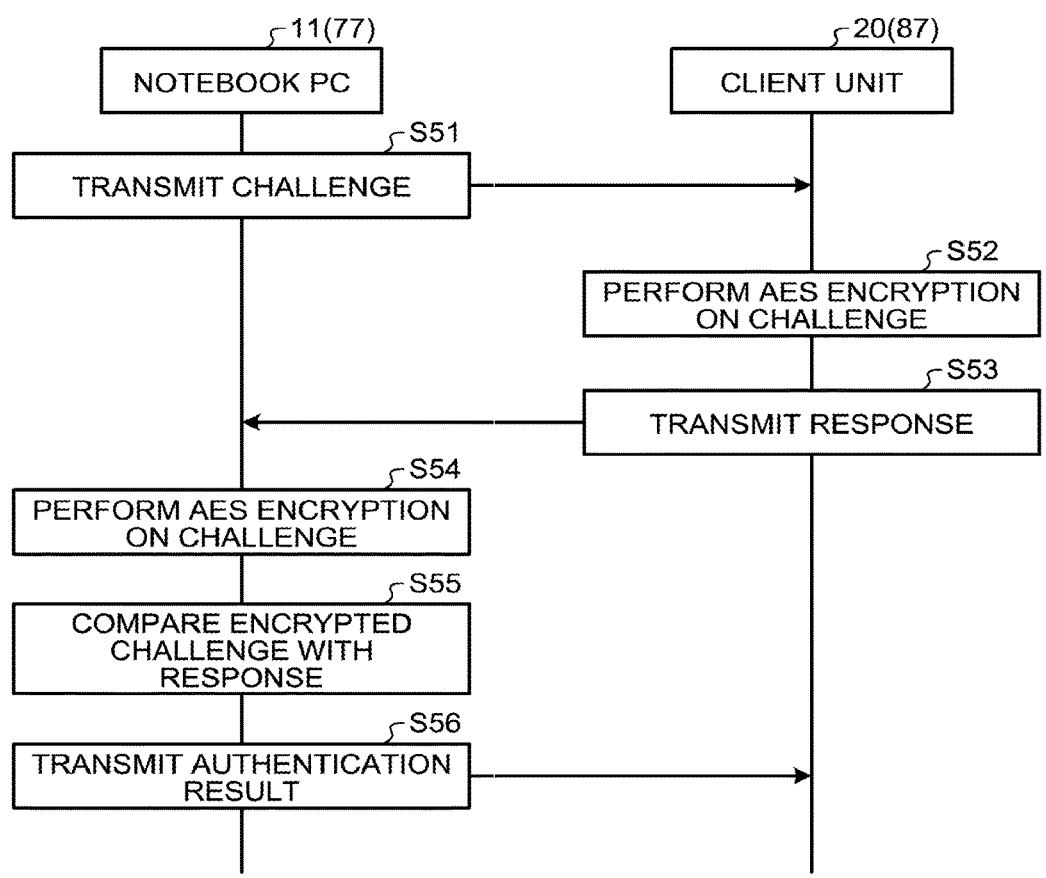
FIG. 17 is a sequence diagram illustrating the sequence of processing for connection establishment between the notebook PC and the electronic blackboard via a network line.

Next, the processing for connection establishment including connection authentication processing between the notebook PC 11 that is present in the same room as the electronic blackboard 2 (2a or 2b) and the client unit 20 of the electronic blackboard 2 will be described based on FIG. 17, as one example. It is assumed here that the authentication processing of a challenge-response system that uses advanced encryption standard (AES) encryption as an example of a common-key encryption system, is performed as the connection authentication processing. While the following communication between the notebook PC 11 (the first remote-screen transfer communication controller 77) and the client unit 20 (the second remote-screen transfer communication controller 87) is performed via the communication network 9, the explanation concerning a communication network is omitted in the following description, unless it is specifically necessary.

First, at Step S51, the first remote-screen transfer communication controller 77 of the notebook PC 11 transmits a challenge (random data) to the second remote-screen transfer communication controller 87. This transmission of the challenge acts also as the processing of connection request from the notebook PC 11 to the electronic blackboard 2.

Next, at Step S52, the second remote-screen transfer communication controller 87 of the client unit 20 performs AES encryption on the received (acquired) challenge with a common key (it is assumed that a password held in advance is used here) as a key, and generates a one-time password referred to as a response code (abbreviated to response, hereinafter).

At Step S53, the second remote-screen transfer communication controller 87 transmits the generated response to the first remote-screen transfer communication controller 77.

The first remote-screen transfer communication controller 77 that received the response, at Step S54, calculates, in the same manner as the response creation procedure performed on the client side, a response by encrypting the challenge by AES with the password as a key. At the next Step S55, the first remote-screen transfer communication controller 77 collates (compares) the received response with the response that the controller itself calculated (the challenge that the controller itself encrypted).

The first remote-screen transfer communication controller 77 then, at the next Step S56, transmits the authentication result to the second remote-screen transfer communication controller 87. At this Step S56, as the result of the foregoing collation, when the response (the encrypted challenge) that the controller itself calculated and the received response match, the first remote-screen transfer communication controller 77 transmits to the second remote-screen transfer communication controller 87 the information that the authentication has succeeded, and when do not match, transmits to the second remote-screen transfer communication controller 87 the information that the authentication has failed. In the embodiment, it is configured that a challenge is transmitted from the notebook PC 11 side, which is the side of device of receiving authentication, acting also as the processing of connection request, and thus, needless to say, a means of preventing illegal connection of a third party is employed separately. Such a means includes including a certain encrypted data, such as the data in which a certain portion of the password used as a key is encrypted, in a part of the information that the authentication succeeded, for example.

When the authentication succeeded, the first remote-screen transfer communication controller 77 establishes the connection with the electronic blackboard 2.

As just described, the processing for connection establishment is performed between the first remote-screen transfer communication controller 77 of the notebook PC 11 and the second remote-screen transfer communication controller 87 of the client unit 20.

As in the foregoing, in the embodiment, the authentication processing of a challenge-response system is performed, and thus, without sending the password (the whole of the password) on the network (without exchanging the password (the whole of the password) by telegraphic message), it can prove that the notebook PC 11 has the correct password to the electronic blackboard 2a side. The third party is unable to generate the response only by the challenge that the notebook PC 11 transmits, and to perform back calculation of the password from the challenge and the response. The challenge that the notebook PC transmits changes each time, and the response also, which is calculated based on that, changes each time. Consequently, even when the third party eavesdrops on packets, deciphering the password is to be difficult. For the illegal connection to the electronic blackboard 2, even when trying to log in the notebook PC 11 by copying the response, because the response changes each time it logs in, the authentication fails. The AES encryption is employed, and the AES encryption is far robust as compared with other encryption such as RC4 frequently used in SSL communication between a web browser and a web server. As just described, in the embodiment, between the notebook PC 11 and the electronic blackboard 2a, the connection authentication processing of a high security level is performed.

As in the foregoing manner, when the authentication by AES encryption between the first remote-screen transfer communication controller 77 and the second remote-screen transfer communication controller 87 succeeds and the connection between the notebook PC 11 and the electronic blackboard 2 is established, the image receiving unit 88 receives image data transmitted from the image transmitting unit 78 via the communication network 9. As the image data in this case, the data of an image displayed on the screen of the notebook PC 11 is typically conceivable, for example. The image receiving unit 88 sends the received image data to the remote-image acquisition unit 92 of the image processor 30.

Figure 18:
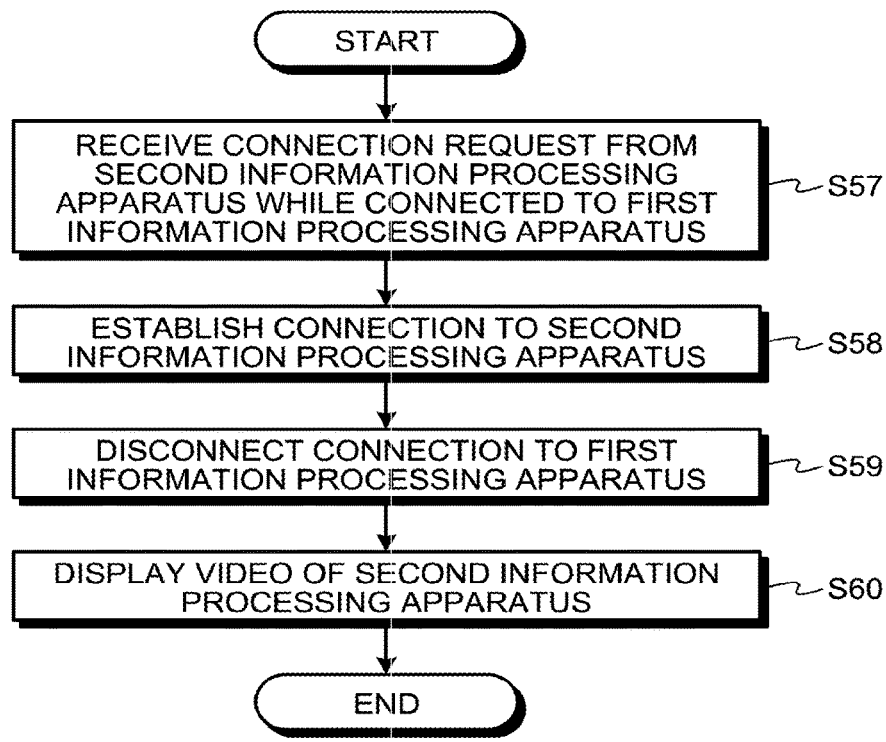
FIG. 18 is a flowchart illustrating the sequence of processing of switching connection among a plurality of information processing apparatuses for the electronic blackboard.

Next, the processing when a connection request is transmitted from a second information processing apparatus such as another notebook PC connected to the communication network 9, for example, while a first information processing apparatus, for example, the notebook PC 11 is connected to the client unit 20 of the electronic blackboard 2 will be described. In FIG. 18, a flowchart indicating the sequence of processing in this case is illustrated. In the following description, a situation in which the second information processing apparatus is, as one example, another notebook PC present in the same room as that of the notebook PC 11 being connected to the communication network 9 will be explained.

When a connection request is made from the second information processing apparatus while being connected to the first information processing apparatus (for example, the notebook PC 11), at Step S57, the second remote-screen transfer communication controller 87 receives that connection request (for example, the same challenge as that in the foregoing). The second remote-screen transfer communication controller 87 then performs the connection authentication processing the same as that of the foregoing with the second information processing apparatus (the communication controller thereof). Subsequently, when the connection authentication succeeds and the information that the authentication succeeded is received from the second information processing apparatus (the communication controller thereof), the second remote-screen transfer communication controller 87 establishes the connection with the second information processing apparatus and disconnects the connection with the first information processing apparatus (the notebook PC 11) (Step S58, Step S59). This ends the change (switching) of destination information processing apparatus for the electronic blackboard 2. In the embodiment, the change (switching) of information processing apparatus of connection destination for the electronic blackboard 2 is performed in what is called a last-win system. At the time of the above-described change (switching) of information processing apparatus of connection destination for the electronic blackboard, an operation of switching cables and the like is not necessary each time it is changed.

As in the foregoing manner, when the connection destination for the electronic blackboard 2 is switched to the second information processing apparatus from the first information processing apparatus, the image receiving unit 88 of the electronic blackboard 2 receives image data transmitted from the second information processing apparatus. The received image data is transmitted to the image processor 30 (the remote-image acquisition unit 92), and in the display superimposing unit 36, the processing as in the foregoing is performed by using the image data and the data of the laid out image is generated as display image data for displaying on the screen of the display 3. Then, an image corresponding to the display image data is displayed on the screen of the display 3 via the video superimposing unit 28 (Step S60).

Processing of Displaying Image Transmitted from Notebook PC 11 on Display 3

Figure 19:
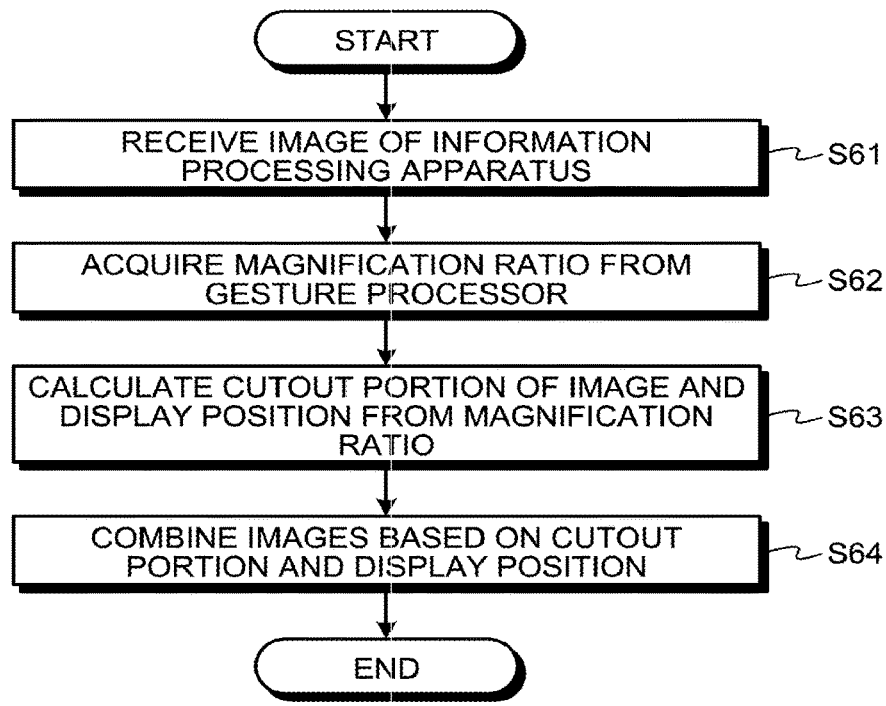
FIG. 19 is a flowchart illustrating the sequence of processing of expanding and displaying an image transmitted from the notebook PC on a display of the electronic blackboard.

Next, the processing of expanding (or reducing) and displaying an image transmitted from the notebook PC 11 on the display 3 will be described. In FIG. 19, the sequence of processing performed at the time of expanding and displaying is illustrated in a flowchart, as one example.

It is assumed as a prerequisite that an image the same as the image displayed on the screen of the notebook PC 11 is being displayed on the screen of the display 3 that the electronic blackboard 2 includes.

The processing illustrated in FIG. 19 is started by the user performing a gesture of pinch out on the screen of the display 3 on which the image is displayed, as one example. The gesture of pinch out means an operation of placing two fingers on the screen and widening an interval between the fingers, and by the movement of the fingers, a magnification ratio and others are also to be specified.

First, at Step S61, the image receiving unit 88 receives the data of the image displayed on the screen of the notebook PC 11 from the image transmitting unit 78 via the communication network 9. This image data is sent to the remote-image acquisition unit 92.

At the next Step S62, the remote-image acquisition unit 92 acquires the magnification ratio specified by the above-described gesture of pinch out performed by the user, together with instruction data (including coordinate data obtained by the coordinate detector 22) of the processing corresponding to the gesture operation from the gesture processor 27. Prior to the calculation of the magnification ratio, the movement (coordinate positions) of the fingers at the time the user performed the gesture on the display 3 is detected by the coordinate detector 22, the event distribution unit 25 determines that it is a gesture operation, and in the gesture processor 27, the processing corresponding to the gesture operation is performed. As a part of this processing, the magnification ratio is calculated. Specifically, the gesture processor 27 saves the current magnification ratio and positional information from screen touch information on the user. For example, when the user touches the display with two fingers and doubles the interval between the fingers, the information indicative of twofold and the positional information indicating at which position the fingers are widened as the center are saved in the gesture processor 27. These two pieces of information are defined as the magnification ratio (the information thereof).

At the next Step S63, the remote-image acquisition unit 92, from the acquired magnification ratio (the information thereof), calculates a cutout portion of the image acquired from the image receiving unit 88 and calculates the display position thereof. This calculation result is sent to the display superimposing unit 36. For example, when doubling and displaying an image of the notebook PC 11, a cutout portion of the image in one-half the size of the image from the notebook PC 11 and the display position of the image of the cutout portion enlarged to double are sent to the display superimposing unit 36. In this way, the remote-image acquisition unit 92 deforms the image corresponding to the image data acquired from the image receiving unit 88 in accordance with the magnification ratio of the gesture processor 27 and transmits it to the display superimposing unit 36.

At the next Step S64, the display superimposing unit 36 combines the images based on the cutout portion and the display position acquired from the remote-image acquisition unit 92. Consequently, a certain expanded image is displayed on the screen of the display 3 by the video superimposing unit 28.

In the case of reducing and displaying an image transmitted from the notebook PC 11 on the display 3, the user performs a gesture of pinch in on the screen of the display 3 on which the image is displayed, and thereby the same processing is performed in the same procedure as the flowchart in FIG. 19, and the image transmitted from the notebook PC 11 is ultimately reduced and displayed on the display 3. In this case, however, the whole of the image is the subject of display, and thus the calculation of a cutout portion of the image is not performed. The gesture of pinch in means an operation of placing two fingers on the screen and narrowing an interval between the fingers, and by the movement of the fingers, a reduction ratio and others are also to be specified.

Processing for Performing Mouse Operation and Keyboard Operation of Notebook PC 11

Next, the processing for performing mouse operation and keyboard operation of the notebook PC 11 by the remote operation performed on the electronic blackboard 2 side will be described based on FIG. 20A and FIG. 20B.

It is assumed as a prerequisite that the image on the screen of the notebook PC 11 is being displayed on the screen of the display 3. It is further assumed that a button for setting the operation target device is being displayed on the screen of the display 3, as one example.

The user of the electronic blackboard 2, for the purpose of setting an information processing apparatus (in this case, the notebook PC 11) connected via the communication network 9 as the device of operation target, clicks its button with the electronic pen 4.

This click operation is detected by the contact detector 24 and the coordinate detector 22, and the event distribution unit 25 determines, based on the detection result, that the operation target device is set to the information processing apparatus.

Under this state (a state that the device of operation target is set to the information processing apparatus), the user of the electronic blackboard 2 performs, with the electronic pen 4 or the hand H, a necessary input operation (mouse operation) on the screen of the display 3 on which the image on the screen of the notebook PC 11 is displayed. The mouse events (the respective events of stroke drawing, UI operation, and gesture operation corresponding to the mouse input) that have arisen by this input operation are acquired, based on the detection results of the coordinate detector 22 and the contact detector 24, by the event distribution unit 25 (Step S71 in FIG. 20A).

At this time, because the operation target device has been set to the information processing apparatus, the event distribution unit 25 transmits information on the mouse events to the notebook PC 11 (Step S72). The transmission of these mouse events to the notebook PC 11 is implemented in the following manner.

That is, the event distribution unit 25 transmits the acquired information on the mouse events to the event transmitting unit 89. The event transmitting unit 89 then transmits the information on the mouse events to the event receiving unit 79 of the notebook PC 11 via the communication network 9.

In this way, when the event receiving unit 79 of the notebook PC 11 receives the information on the mouse events, the mouse operation in accordance with the information on the mouse events is performed on the screen of the notebook PC 11 by the operating system (OS) of the notebook PC 11.

Meanwhile, when performing keyboard operation of the notebook PC 11 by remote operation, under the state that the operation target device is set to the information processing apparatus, the user of the electronic blackboard 2 performs an input operation, with the electronic pen 4 or the hand H, on the keyboard displayed on the screen of the display 3 together with the image on the screen of the notebook PC 11.

Figure 20B:
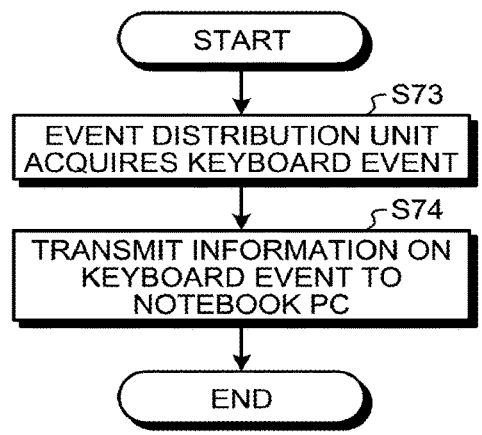
FIG. 20B is a diagram for explaining the processing of performing a keyboard operation of the notebook PC by remote operation from the electronic blackboard side.

The keyboard events that have arisen by this input operation are acquired by the event distribution unit 25 via the key-event input unit 91 (Step S73 in FIG. 20B).

At this time, because the operation target device has been set to the information processing apparatus, the event distribution unit 25 transmits information on the keyboard events to the notebook PC 11 (Step S74). The transmission of the information on these keyboard events to the notebook PC 11 is implemented in the same manner as that in the foregoing.

When the event receiving unit 79 of the notebook PC 11 then receives the information on the keyboard events, the keyboard input operation in accordance with that data is performed on the notebook PC 11 side by the OS of the notebook PC 11.

Operation of Each Electronic Blackboard in Remote Sharing Processing among Electronic Blackboards Next, the operation of each electronic blackboard in remote sharing processing among the electronic blackboards constituting the image processing system 1 in the embodiment will be described.

It is assumed here, as one example, that the image processing system 1 is constituted with electronic blackboards 2a, 2b, and 2c, the electronic blackboard 2a is a host device (referred to as host device 2a) that hosts remote sharing processing, and the electronic blackboards 2b and 2c are participation devices (referred to as participation devices 2b, 2c) that participate in the remote sharing processing that the electronic blackboard 2a has started. The attention is paid to the operation of the server unit 90 and the client unit 20 of the electronic blackboard 2a, and the operation of the client units 20 of the electronic blackboards 2b and 2c. To the electronic blackboards 2a, 2b, and 2c, connected are displays 3a, 3b, and 3c, respectively, and further connected are notebook PCs 6a, 6b, and 6c, respectively. In the electronic blackboards 2a, 2b, and 2c, being used are electronic pens 4a, 4b, and 4c, respectively.

Figure 21:
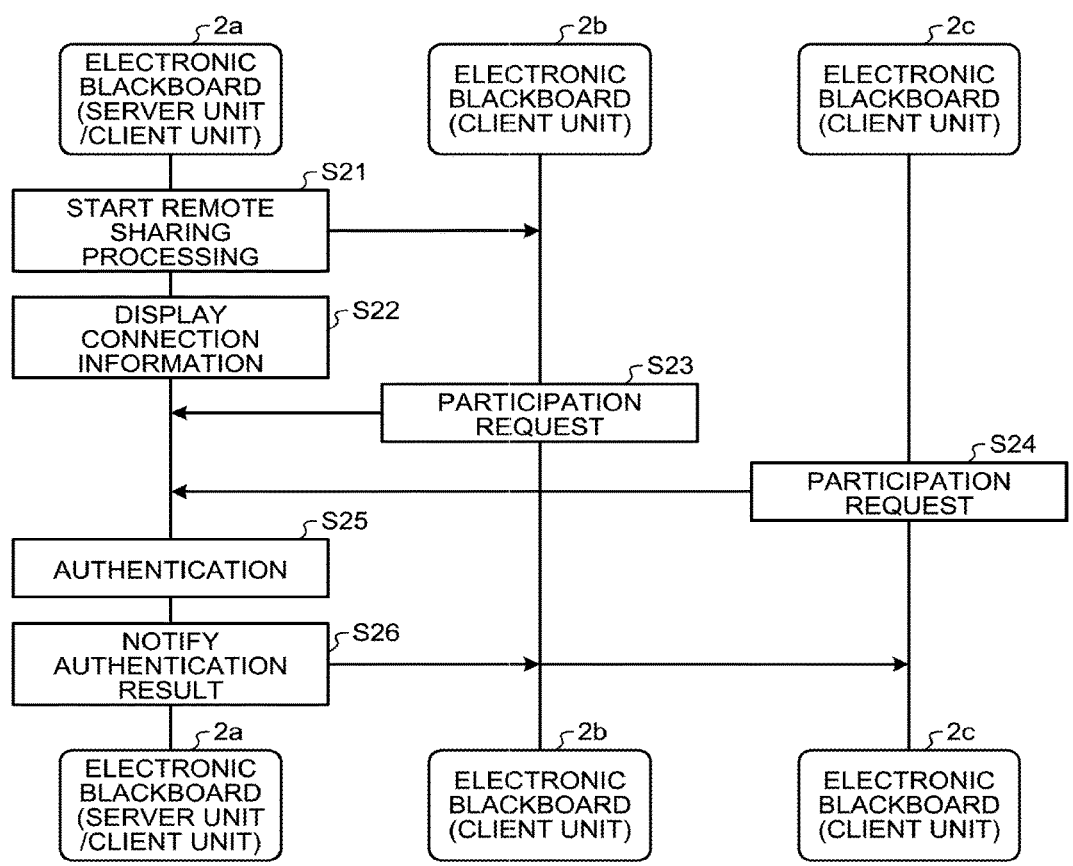
FIG. 21 is a sequence diagram illustrating the sequence of start of remote sharing processing and of participation processing.

The starting of remote sharing processing and the participation processing will be described first based on the sequence diagram in FIG. 21 illustrating the sequence of start of remote sharing processing and of participation processing.

It is assumed that each of the electronic blackboards 2a, 2b, and 2c is turned on by the user and thereby the client units 20 are being activated.

First, at Step S21, the user of the electronic blackboard 2a gives instructions to start remote sharing processing via an input device such as a touch panel, and thereby the remote starting processor 61 of the client unit 20 outputs to the remote-connection request receiving unit 71 of the server unit 90 a signal instructing the start-up of the server unit 90. Consequently, in the electronic blackboard 2a, the server unit 90 is started up, in addition to the client unit 20. The host device 2a (the server unit 90) starts remote sharing processing (preprocessing to receive participation processing of the participation devices 2b and 2c in the remote sharing processing).

At the next Step S22, the UI image generator 33 in the client unit 20 of the host device 2a generates a UI image that displays connection information to establish the connection with the host device 2a, and outputs it to the video superimposing unit 28 via the display superimposing unit 36. The video superimposing unit 28 displays the UI image on the display 3a. The connection information includes the IP address of the host device and a passcode that is issued by the remote connection processor 81 for the remote sharing processing this time. The passcode is read out from the passcode management unit 810 by the remote connection processor 81, and via the remote-connection result transmitting unit 72 and the remote starting processor 61 (the communication controller 60) in sequence, is transmitted to the UI image generator 33 (the image processor 30) (see FIG. 15 and FIG. 3).

The user of the host device 2a looks at the connection information displayed on the display 3a, and delivers its content to the users of the participation devices 2b and 2c by telephone, e-mail, and others. When the IP address of the host device 2a is managed in the connection destination list stored in the connection-destination management table 440, the passcode only needs to be included in the connection information. The users of the participation devices 2b and 2c input the delivered connection information into the respective participation devices 2b and 2c by using an input device such as a touch panel.

When the participation devices 2b and 2c receive the input of connection information, at Step S23 and Step S24, the remote participation processors 62 in the respective client units 20 transmit, by using the IP address included in the connection information, the passcode to the communication controller 70 in the server unit 90 of the host device 2a via the communication network 9. Thus, requests for participation in the remote sharing processing that the host device 2a has started are performed. Consequently, the remote-connection request receiving unit 71 of the communication controller 70 receives the participation request (including the passcode) from each of the electronic blackboards 2b and 2c, and outputs the passcodes to the remote connection processor 81.

When the host device 2a receives the passcodes, at Step S25, the remote connection processor 81 in the server unit 90 thereof authenticates the received passcodes by using the passcodes managed by the passcode management unit 810. The client units 20 of the respective participation devices 2b and 2c are, at Step S26, notified of the authentication result by the remote-connection result transmitting unit 72. This establishes the communication in the remote sharing processing between the host device 2a and the participation devices 2b and 2c, and completes the starting of remote sharing processing and the participation processing.

Processing of Sharing Image Data in Remote Sharing Processing

Figure 22:
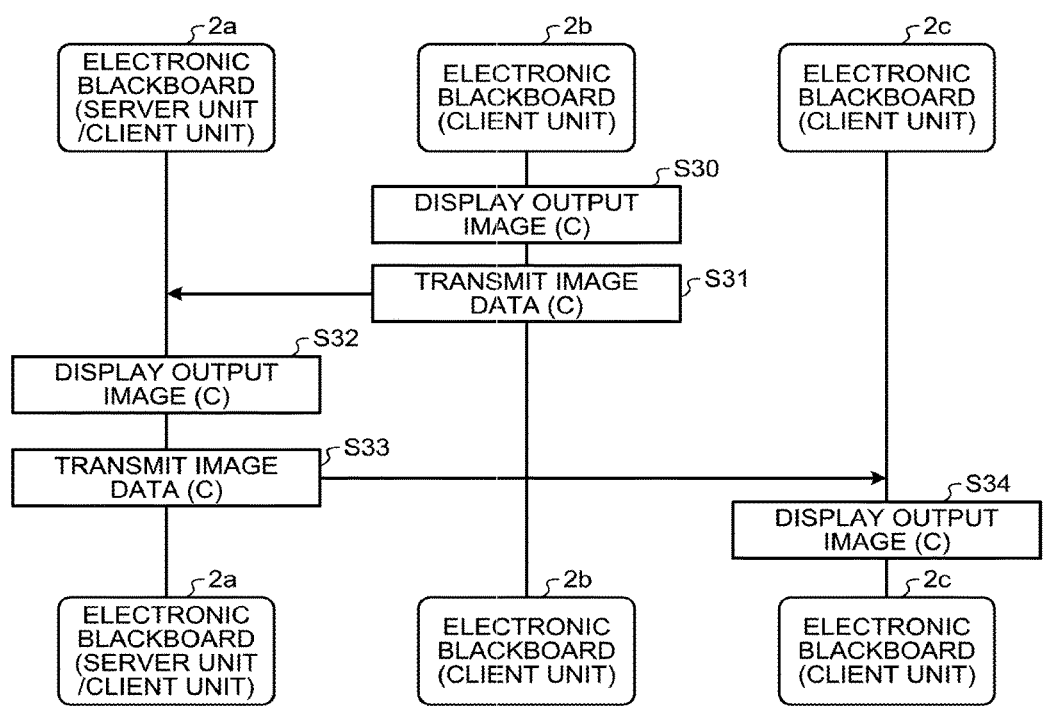
FIG. 22 is a sequence diagram illustrating the sequence of processing of sharing image data in the remote sharing processing.

Next, the processing of sharing image data in remote sharing processing will be described based on the sequence diagram in FIG. 22 illustrating the sequence of processing of sharing image data.

First, at Step S30, the image acquisition unit 31 in the client unit 20 of the participation device 2b generates image data (output image (C)) by using an output video of the notebook PC 6b. The generated image data (output image (C)) is output to the video superimposing unit 28 via the display superimposing unit 36 and is displayed on the display 3b of the participation device 2b (see FIG. 3).

At the next Step S31, the remote-image transmitting unit 63 (the communication controller 60) in the client unit 20 of the participation device 2b receives the image data (output image (C)) from the image acquisition unit 31 (the image processor 30), and via the communication network 9, transmits it to the communication controller 70 (the remote-image receiving unit 73) in the server unit 90 of the host device 2a. The image data (output image (C)) is transmitted to the remote image processor 82 via the remote-image receiving unit 73, and is stored in the image-data management unit 830 (see FIG. 15).

Next, at Step S32, the video superimposing unit 28 in the client unit 20 of the host device 2a displays the image data (output image (C)) received from the participation device 2b on the display 3a. However, the output image (C) received by the remote-image receiving unit 73 in the server unit 90 at Step S31 is sent to the video superimposing unit 28 in the client unit 20 in sequence via the remote image processor 82 and the remote-image transmitting unit 74 in the server unit 90 and via the remote-image receiving unit 64 and the display superimposing unit 36 in the client unit 20.

At the next Step S33, the remote-image transmitting unit 74 (the communication controller 70) in the server unit 90 of the host device 2a transmits (at Step S32) the image data (output image (C)) to the remote-image receiving unit 64 in the client unit 20 of the same host device 2a, and transmits the image data (output image (C)) to the communication controller 60 (the remote-image receiving unit 64) in the client unit 20 of the participation device 2c that is other than the participation device 2b that has transmitted that image data.

In the participation device 2c, the output image (C) received by the remote-image receiving unit 64 in the client unit 20 is sent to the video superimposing unit 28 via the display superimposing unit 36.

Next, at Step S34, the video superimposing unit 28 in the client unit 20 of the participation device 2c displays the image data (output image (C)) sent from the participation device 2b via the host device 2a (the server unit 90) on the display 3c. However, the output image (C) received by the remote-image receiving unit 64 in the client unit 20 at Step S33 is sent to the video superimposing unit 28 via the display superimposing unit 36. This completes the processing of sharing image data in the remote sharing processing.

When not only the image data of the output image (C) but also the image data of the UI image (A) and the stroke image (B) are input to the display superimposing unit 36, the display superimposing unit 36 generates and outputs a superimposed image (A, B, C) to the video superimposing unit 28. The video superimposing unit 28 displays the superimposed image (A, B, C) on the display 3c. When the image data of a video (E) for teleconference is further sent to the video superimposing unit 28 from the TV conference terminal 7, the video superimposing unit 28 superimposes the image data for teleconference onto the superimposed image (A, B, C) by picture-in-picture and displays it on the display 3c.

Processing of Sharing Operation Data in Remote Sharing Processing

Figure 23:
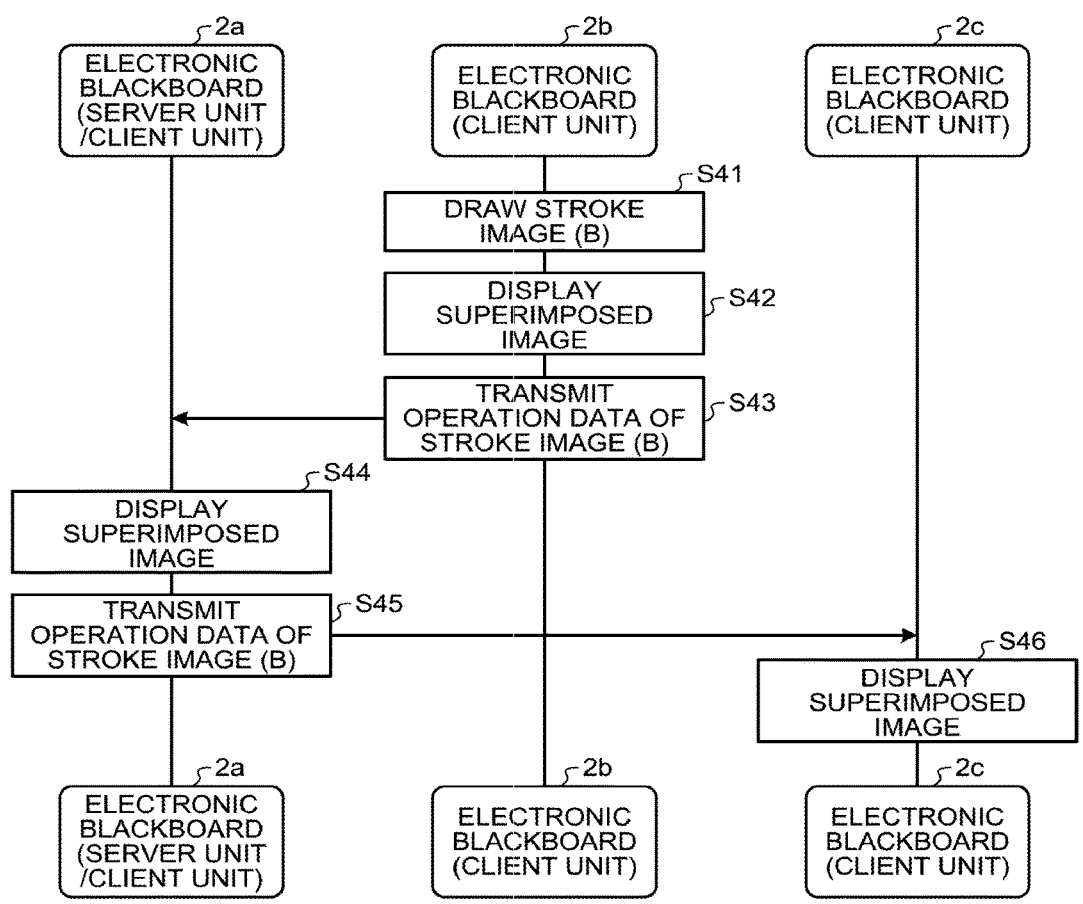
FIG. 23 is a sequence diagram illustrating the sequence of processing of sharing operation data in the remote sharing processing.

Next, the processing of sharing operation data in remote sharing processing will be described based on the sequence diagram in FIG. 23 illustrating the sequence of processing of sharing operation data.

First, at Step S41, the participation device 2b draws a stroke image (B) that the user draws by using the electronic pen 4b on the electronic blackboard 2b, and displays it on the display 3b.

At the next Step S42, the display superimposing unit 36 in the client unit 20 of the participation device 2b, as illustrated in FIG. 4, superimposes the stroke image (B) onto a UI image (A), an output image (C), and a background image (D), and the video superimposing unit 28 displays a superimposed image (A, B, C, D) on the display 3b of the electronic blackboard 2b. The stroke processor 32, however, receives the operation data of the stroke image (B) from the coordinate detector 22 and the contact detector 24 via the event distribution unit 25, and transmits it to the display superimposing unit 36 (see FIG. 3).

At the next Step S43, the remote-operation transmitting unit 65 in the client unit 20 of the participation device 2b receives the data (operation data) of the stroke image (B) from the stroke processor 32 (the image processor 30), and via the communication network 9, transmits it to the communication controller 70 (the remote-operation receiving unit 75) of the host device 2a (see FIG. 15).

In the host device 2a, the data (operation data) of the stroke image (B) received by the remote-operation receiving unit 75 in the server unit 90 is sent to the operation combining processor 84 via the remote operation processor 83.

The data of the stroke image (B) is the data indicated for each stroke data ID (see FIG. 6). For example, as in the foregoing, when the user draws an alphabet "T" by using the electronic pen 4, the respective pieces of data of the stroke image (B) that two stroke data IDs represent are to be transmitted in sequence.

Next, at Step S44, the host device 2a displays on the display 3a the superimposed image (A, B, C) including the data of the stroke image (B) that has been sent from the participation device 2b. The operation combining processor 84 of the host device 2a combines a plurality of pieces of stroke image (B) data sent in sequence via the remote operation processor 83 and stores the combined data in the operation-data storage unit 840, and then returns the combined data to the remote operation processor 83. The data of the stroke image (B) after the combination is transmitted to the display superimposing unit 36, via the remote-operation transmitting unit 76 in the server unit 90 of the host device 2a and the remote-operation receiving unit 66 in the client unit 20. The display superimposing unit 36 superimposes the stroke image (B) after the combination on the UI image (A), the output image (C) and the background image (D), and outputs the superimposed image (A, B, C, D) to the video superimposing unit 28. The video superimposing unit 28 displays the superimposed image (A, B, C, D) on the display 3a of the host device 2a.

At the next Step S45, the remote-operation transmitting unit 76 (the communication controller 70) in the server unit 90 of the host device 2a receives the data of the stroke image (B) after the combination from the remote operation processor 83 (at Step S44) and transmits it to the remote-operation receiving unit 66 in the client unit 20 of the same host device 2a, and via the communication network 9, transmits it to the communication controller 60 (the remote-operation receiving unit 66) in the client unit 20 of the participation device 2c that is other than the participation device 2b that has transmitted the data of the stroke image (B).

Next, at Step S46, the participation device 2c displays the superimposed image (A, B, C) on the display 3c. The remote-operation receiving unit 66 of the electronic blackboard 2c outputs the data of the stroke image (B) after the combination received at Step S45 to the image processor 30 (the display superimposing unit 36). The display superimposing unit 36, in the same manner as at Step S44, superimposes the stroke image (B) after the combination on the UI image (A), the output image (C), and the background image (D), and outputs the superimposed image (A, B, C, D) to the video superimposing unit 28. The video superimposing unit 28 displays the superimposed image (A, B, C, D) on the display 3c. This completes the processing of sharing operation data in the remote sharing processing.

In the above-described processing, it is configured such that both the output image (C) and the background image (D) are displayed on the display 3c. However, alternatively, it may be configured such that one of the output image (C) and the background image (D) is superimposed on the UI image (A) and on the stroke image (B) after the combination, and displayed on the display 3.

Processing of Terminating Participation in Remote Sharing Processing

Figure 24:
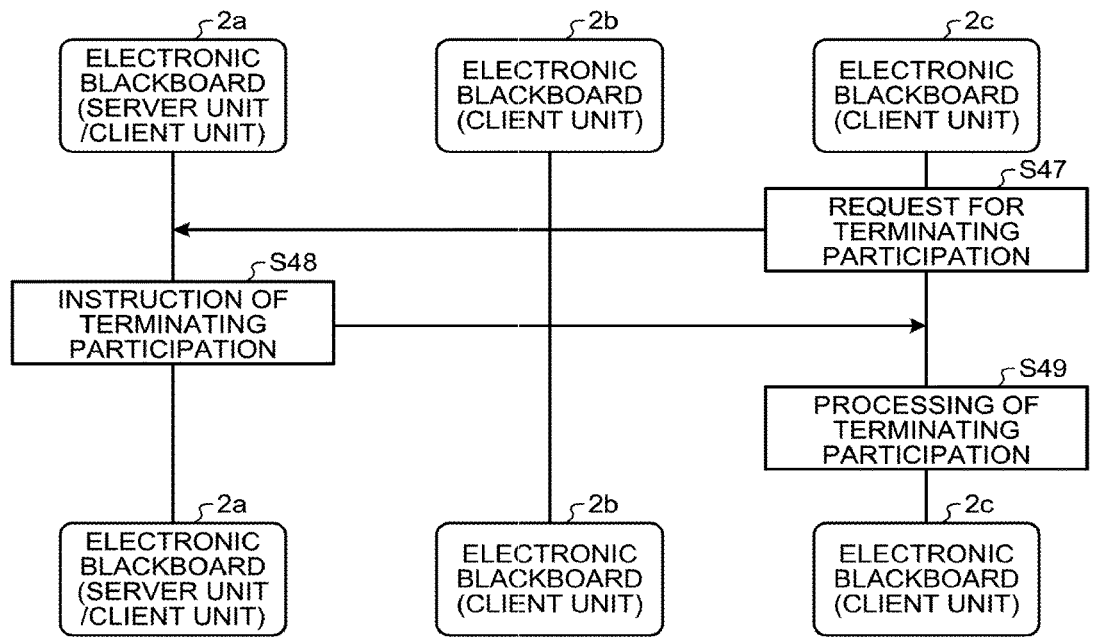
FIG. 24 is a sequence diagram illustrating the sequence of processing of terminating participation in the remote sharing processing.

Lastly, with the participation device 2*c* as an example, the processing of terminating the participation in remote sharing processing will be described based on the sequence diagram in FIG. 24 illustrating the sequence of processing of terminating the participation.

First, at Step S47, when the user of the participation device 2*c* requests termination of participation in the remote sharing processing by using an input device such as a touch panel, the remote participation processor 62 in the client unit 20 of the participation device 2*c* requests the termination of participation from the communication controller 70 (the remote-connection request receiving unit 71) in the server unit 90 of the host device 2*a*. The remote-connection request receiving unit 71 of the host device 2*a* receives the request of termination of participation from the electronic blackboard 2*c*, and transmits it to the remote connection processor 81 together with the IP address of the electronic blackboard 2*c*. The remote connection processor 81 deletes the participation point information on the participation device 2*c* (the IP address of the electronic blackboard 2*c* and the name of the point at which the electronic blackboard 2*c* is installed) from the participation-point management table 820, and transmits the IP address of the electronic blackboard 2*c* and a notice of deletion to the remote-connection result transmitting unit 72.

Next, at Step S48, the remote-connection result transmitting unit 72 (the communication controller 70) notifies the communication controller 60 (the remote participation processor 62) in the client unit 20 of the participation device 2*c* of the termination of participation via the communication network 9.

Next, at Step S49, the remote participation processor 62 in the client unit 20 of the participation device 2*c* disconnects the communication of the remote sharing processing. This completes the termination processing of participation in the remote sharing processing.

As apparent from the foregoing explanation, in the embodiment, configured is an image data generator that generates display image data by using image data from an information processing apparatus such as the notebook PC 11 connected via the communication network 9, by the image processor 30 (including the remote-image acquisition unit 92, the display superimposing unit 36, and others) that the client unit 20 of the electronic blackboard 2 has. When a button for setting an operation target device displayed on the screen of the display 3 is clicked, the event distribution unit 25 recognizes the content of the setting based on the detection results of the contact detector 24 and the coordinate detector 22. Thus, in the embodiment, configured is a setting unit that includes a touch panel (the contact sensor 115) provided on the display 3 on which the above-described buttons are displayed and includes the contact detector 24 and the coordinate detector 22 that respond thereto and that is capable of setting an operation target device on which the operation corresponding to an input event is performed. However, it is not limited to this, and switches composed of hardware for setting the operation target device may be provided as the setting unit. In the above description, it has been defined that the operation target device can be set to any of the information processing apparatus (the notebook PC 11 and others) and the electronic blackboard 2 by the click operation of the button for setting the operation target device. However, it is not limited to this, and it may be configured such that the operation target device is set to the electronic blackboard 2 itself while the button and others for setting the operation target device are not operated, and only when the button and others for setting the operation target device are operated, the operation target device is switched to the information processing apparatus (the notebook PC 11 and others) connected to the communication network. That is, such a setting unit may be provided.

As explained in detail in the foregoing, in the image processing system 1 in the embodiment, the electronic blackboard 2 is connected to the notebook PC 11 as an information processing apparatus having a communication function via the communication network 9 (for example, a corporate wireless LAN). The electronic blackboard 2 includes the second remote-screen transfer communication controller 87 that performs the processing for connection establishment with the notebook PC 11, more accurately the first remote-screen transfer communication controller 77 of the notebook PC 11, connected via the communication network 9; the image receiving unit 88 that receives, via the communication network 9, image data from the notebook PC 11 for which the connection has been established; the image processor 30 (the remote-image acquisition unit 92, the display superimposing unit 36) that generates display image data by using the received image data; and the display 3 to display an image corresponding to the display image data generated by the image processor 30. Consequently, even when the notebook PC 11 and the electronic blackboard 2 that are located in the same room are distant and both cannot be connected by the cable 10 and the like, an image (video) displayed on the screen of the notebook PC 11 can be displayed on the display 3.

Furthermore, in a state that the connection between the notebook PC 11 (a first information processing apparatus) and the electronic blackboard 2 is established, when a connection request is made to the electronic blackboard 2 from a second information processing apparatus connected to the communication network 9 such as a PC or other electronic blackboards, switching of the connection to the electronic blackboard 2 is performed in what is called a last-win system. Consequently, at the time of changing the connection each time, cumbersome work such as removing and inserting a communication cable or switching a switch is unnecessary.

Thus, the electronic blackboard 2 in the embodiment has good usability, for example, at the time of a meeting with a large number of people in a large conference room.

Moreover, according to the electronic blackboard 2 in the embodiment, the user performs a gesture operation (pinch out) specifying expansion and reduction by the hand H when an image of the notebook PC 11 is displayed on the display 3, and thereby the expansion and reduction of the display image on the display 3 can be performed easily.

According to the electronic blackboard 2 in the embodiment, the buttons for setting an operation target device are displayed on the screen of the display 3, and by the user clicking the buttons by using the electronic pen 4, the operation target device can be set to any of the notebook PC 11 and the electronic blackboard 2 itself. Then, when the button for setting the operation target device is clicked by the user and the operation target device is set to the notebook PC 11, the event distribution unit 25 recognizes that the operation target device has been set to the notebook PC 11 based on the detection results of the coordinate detector 22 and the contact detector 24, and transmits information on subsequently acquired events to the event transmitting unit 89. The event transmitting unit 89 transmits the received information on the events to the event receiving unit 79 of the notebook PC 11 via the communication network 9.

Consequently, the operation corresponding to the information on the events received by the event receiving unit 79 is to be performed by the OS of the notebook PC 11. That is, when the information on the event received by the event receiving unit 79 is the information on a mouse event, the mouse operation corresponding to that mouse event is performed on the screen of the notebook PC 11 by the OS. When the information on the event received by the event receiving unit 79 is the information on a keyboard event, the keyboard input corresponding to that keyboard event is performed by the OS of the notebook PC 11.

Meanwhile, when the button for setting the operation target device is clicked by the user and the operation target device is set to the electronic blackboard 2 itself, the event distribution unit 25 recognizes that the operation target device has been set to the electronic blackboard 2 itself based on the detection results of the coordinate detector 22 and the contact detector 24, and transmits information on subsequently acquired events to any of the operation processor 26, the gesture processor 27, and the stroke processor 32 depending on the type of the event. In this case, on the electronic blackboard 2 side, the operation and processing corresponding to the events acquired by the event distribution unit 25 are performed.

As apparent from the explanation in the foregoing, the user of the electronic blackboard 2 in the embodiment can perform, by mouse operation or keyboard input on the screen of the display 3 of the electronic blackboard 2, remote operation of an information processing apparatus having a communication function such as the notebook PC 11, in addition to the operation of the electronic blackboard 2 in the same manner as normal operation.

In the above-described embodiment, the communication network 9 has been exemplified as a corporate wireless LAN. The communication network, however, may be not only a corporate wired-LAN but also a wide area network other than a corporate LAN such as a network that includes in part the Internet and/or a mobile phone communication network. However, when the electronic blackboard 2 and the notebook PC 11 are located not in the same room but located remotely, at the time of switching the connection of the information processing apparatus for the electronic blackboard 2 in the foregoing last-win system, some means to preannounce the switching of the connection to the user of that electronic blackboard 2 and others need to be devised.

In the above-described embodiment, as one example of common key encryption, a situation of employing AES encryption that uses Rijndael algorithm has been explained. However, it is not limited to this, and other encryption such as RC4, DES, and 3DE that use other algorithms can be employed.

In the above-described embodiment, it has been defined that the connection authentication processing of a challenge-response system that uses a common-key encryption system is employed in the connection authentication processing between the electronic blackboard 2 and the notebook PC 11. The connection authentication processing, however, is not limited to the connection authentication processing of a challenge-response system.

In the above-described embodiment, the program that performs processing concerning the communication between an information processing apparatus (for example, the notebook PC 11) and the electronic blackboard 2 and including the processing for the foregoing connection establishment may be stored as a program for downloading in a storage device that the electronic blackboard 2 has, or may be stored in an information recording medium such as a CD-ROM and a DVD-ROM. In the former case, the program only needs to be configured to be downloaded by the user of the notebook PC 11 connected to the electronic blackboard 2 via the communication network 9 and to be installed in the notebook PC 11. In the latter case, the manufacturer of the electronic blackboard may sell that information recording medium to the user as an accessory of the electronic blackboard 2. When the manufacturer of the electronic blackboard manufactures notebook PCs and others also, the manufacturer may sell the electronic blackboard, the information recording medium, and the notebook PC to the user as a set. In these cases, it can be said that the information recording medium constitutes a part of the image processing system including the electronic blackboard and the notebook PC that are connected via a communication network.

In the above-described embodiment, the electronic blackboard has been employed as one example of the image processing apparatus. However, it is not limited to this, and it can be applied to a telestrator used for digital signage, sports, weather forecast, and others; and to a remote-image (video) diagnostic apparatus and others. As the information processing apparatus, a situation of employing a notebook PC has been exemplified. However, it is not limited to this, and a terminal capable of supplying image frames such as a desktop PC, a tablet PC, a personal digital assistant (PDA), a digital video camera, a digital camera, a game machine, and others can be employed. While a USB memory has been employed as one example of the recording medium, it is not limited to this, and various recording media such as an SD card can also be employed.

Processing of Click Event

Outline

The processing of a click event in the embodiment will be described. The electronic blackboard in the embodiment has a feature in that a click operation on a notebook PC can be performed remotely during stroke drawing.

As in the foregoing, the electronic blackboard 2 can perform a mouse operation of the notebook PC 11 by remote operation. To perform a mouse operation, it is necessary to keep the information processing apparatus (the notebook PC 11) set to an operation target device. Conversely, to process a mouse event input to the electronic blackboard 2 as stroke drawing, it is necessary that the electronic blackboard 2 is being set to the operation target device. Thus, to alternately perform the mouse operation and the stroke drawing, it is necessary to switch the operation target device each time.

The mouse operation of the notebook PC 11 performed from the electronic blackboard 2 is often a click operation such as start-up and termination of an application, and opening and closing of a file. Consequently, in the embodiment, provided is a method of processing a click on the display 3 as a click operation of the notebook PC 11 when an image on the screen of the notebook PC 11 is displayed on the display 3 and a stroke image can be drawn on the display 3.

It is assumed as a prerequisite that the electronic blackboard 2 is set as a first operation target device and is in a state that a stroke image can be hand-drawn by using the electronic pen 4. Moreover, it is assumed that the notebook PC 11 is set as a second operation target device and an image on the screen of the notebook PC 11 is being displayed on the screen of the display 3.

Due to a touch operation on the display 3 (screen) by the electronic pen 4, an event that the electronic pen 4 was pressed (pen-down), an event that the electronic pen 4 was moved (pen-move), and an event that the electronic pen 4 was released (pen-up) result. These pen events can be processed by mouse events. For example, in .net 4 of Windows (registered trademark) 7, the MouseDown/PreviewMouseDown event, the MouseMove/PreviewMouseMove event, and the MouseUp/PreviewMouseUp event, respectively, are used.

Each preview event can be received before each mouse event is received, and thus, each piece of processing indicated in the embodiment is processed based on the preview event. The mouse event received after a preview event is deleted. In the following description, as the operation of the electronic pen 4 (the touch input of the electronic pen 4), the terms of pen event, pen-down, pen-move, and pen-up are used.

Figure 25:
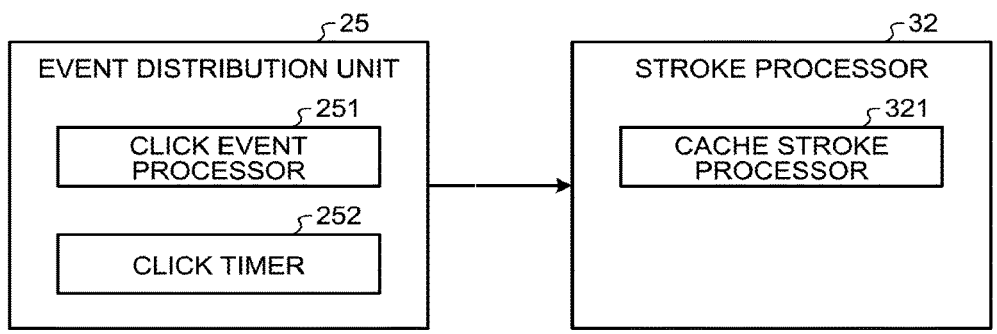
FIG. 25 is a functional block diagram of an event distribution unit and a stroke processor.

FIG. 25 is a functional block diagram of the event distribution unit and the stroke processor. The event distribution unit 25 of the electronic blackboard 2 in the embodiment includes a click event processor 251 (a drawing-click determining unit, a click event generator) and a click timer 252 (a countdown timer).

The click event processor 251 performs the processing of determining whether a received pen event is the one concerning the drawing of a stroke image or is a click operation. When the click event processor 251 determines that the received pen event is the one concerning the drawing of a stroke image, the event distribution unit 25 causes a cache stroke processor 321 of the stroke processor 32 to draw the stroke image. When the click event processor 251 determines that the pen event is a click operation, the click event processor 251 generates a click event and transmits, to the notebook PC 11 that is the operation target device, the information on the click event from the event transmitting unit 89.

The click timer 252 performs the processing of delaying a transmission timing of a click event transmitted to the notebook PC 11 in remote operation by a designated time so that, when the user draws a dot, the dot is not erroneously detected as a click operation.

The stroke processor 32 of the electronic blackboard 2 in the embodiment includes the cache stroke processor 321. The cache stroke processor 321 performs the processing of drawing by temporarily storing each of the coordinates of a series of pen events acquired by the click event processor 251 into a cache stroke [s] (a cache memory) and temporarily delaying the drawing of the stroke image.

In a certain work area of the RAM 103 in FIG. 2, a cache stroke [s] (a cache memory) in which the coordinates of pen events are temporarily stored is provided. In the cache stroke [s], the data equivalent to coordinate arrangement data (FIG. 7) of each piece of stroke data (FIG. 6) for drawing a stroke image, that is, at least each piece of coordinate data of pen-down, pen-move, and pen-up is temporarily stored.

When the pen event received by the click event processor 251 is the one concerning a stroke drawing, the cache stroke processor 321 reads out the data in the cache stroke [s], and performs the drawing processing as a stroke image.

The terms of "cache mode", "click monitoring mode", and "consecutive drawing flag", which are truth-values used in the embodiment, and the terms of "initial pen position [p]", "click position [c]", and "pen-up time [t]", which are variables, will be described.

The "cache mode" is a flag that indicates whether to store the data that is equivalent to coordinate arrangement data (FIG. 7) of each piece of stroke data (FIG. 6) into the cache stroke [s]. The cache mode is expressed in a truth-value, and when the value is "true", the respective pieces of coordinate data and others of a series of pen-down and pen-move are stored in the cache stroke [s] based on received preview events.

After a preview event of pen-up is received, the cache mode turns into "false". That is, by the cache mode being "true", only a series of pieces of stroke data is stored in the cache stroke [s].

The "click monitoring mode" is a flag that indicates, concerning the preview event that the event distribution unit 25 received, if it is necessary to monitor whether it is a click operation. The click monitoring mode is expressed in a truth-value, and when the value is "true", it indicates that there is a possibility that the received preview event is the one concerning a click operation, and that there is a need to monitor it. When the value of the click monitoring mode is "false", it indicates that the received preview event is the one concerning stroke drawing, and that there is no need to monitor whether it is a click operation.

The "consecutive drawing flag" is a flag that indicates whether each piece of pen event data stored in the cache stroke [s] ought to be consecutively drawn as a stroke image. When the value of the consecutive drawing flag is "true", it indicates that the preview event that the event distribution unit 25 received concerns a stroke image, and the cache stroke processor 321 draws the stroke image. When the value of the consecutive drawing flag is "false", the cache stroke processor 321 does not perform drawing of the stroke image based on the coordinate arrangement data stored in the cache stroke [s].

The "initial pen position [p]" is a variable that stores therein the pen position of the latest pen-down.

The "click position [c]" is a variable that stores therein the pen position of pen-down of a series of pen events after pen-up.

The "pen-up time [t]" is a variable that stores therein a pen-up time of a stroke image other than a dot.

The values of the foregoing truth-values and variables are stored in respective certain work areas of the RAM 103 in FIG. 2.

Pen-Down Processing

Figure 26:
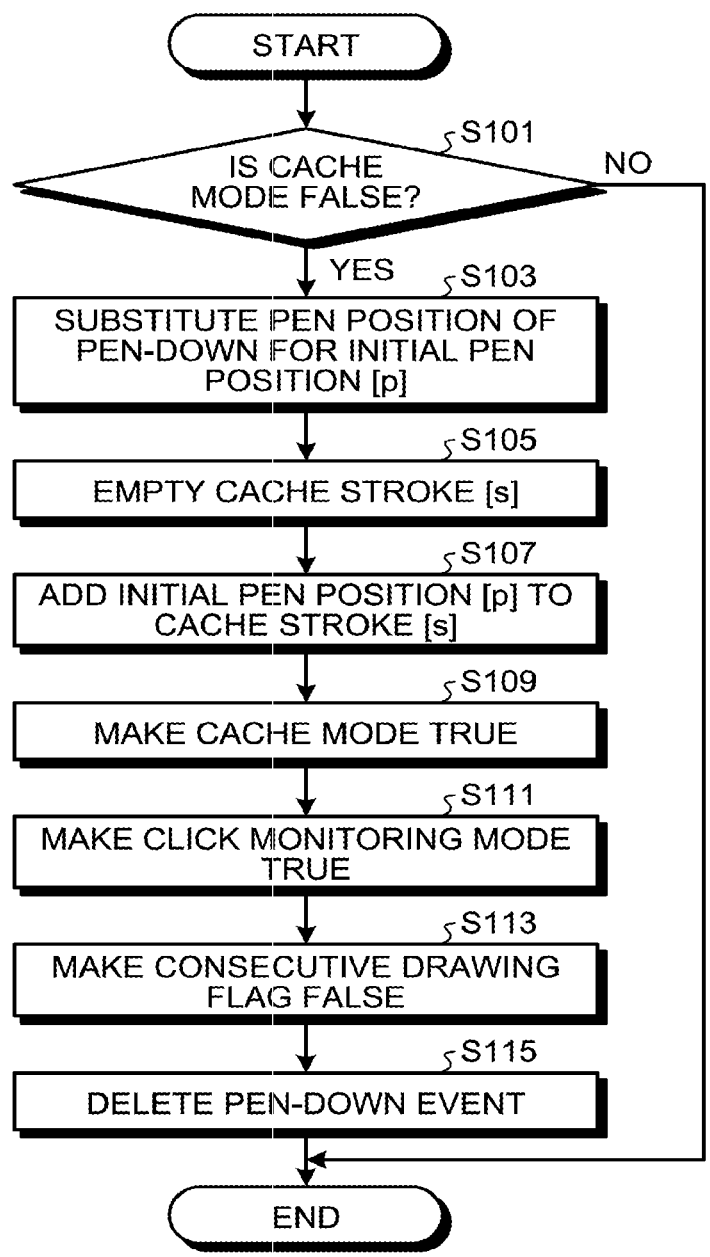
FIG. 26 is a flowchart illustrating the sequence of processing performed when a preview event of pen-down was received.

The processing performed when the event distribution unit 25 received a preview event of pen-down (PreviewMouseDown) will be described. FIG. 26 is a flowchart illustrating the sequence of processing performed at the time of receiving a preview event of pen-down. In the present processing, the cache stroke [s], the cache mode, the click monitoring mode, and the consecutive drawing flag are initialized.

At Step S101, the click event processor 251 checks whether the cache mode is "false". When the cache mode is "true" (No at Step S101), the click event processor 251 ends the processing. When the cache mode is "false" (Yes at Step S101), the click event processor 251 performs the processing at Step S103.

At Step S103, the click event processor 251 substitutes the coordinates of the pen-down for the initial pen position [p].

At Step S105, the cache stroke processor 321 empties the cache stroke [s]. That is, the cache stroke processor 321 initializes the cache stroke [s].

At Step S107, the cache stroke processor 321 adds the data of the initial pen position [p] to the cache stroke [s].

At Step S109, the click event processor 251 makes the cache mode "true".

At Step S111, the click event processor 251 makes the click monitoring mode "true".

At Step S113, the click event processor 251 makes the consecutive drawing flag "true".

At Step S115, the click event processor 251 deletes a pen-down event received after receiving the preview event of pen-down.

Pen-Move Processing

Figure 27:
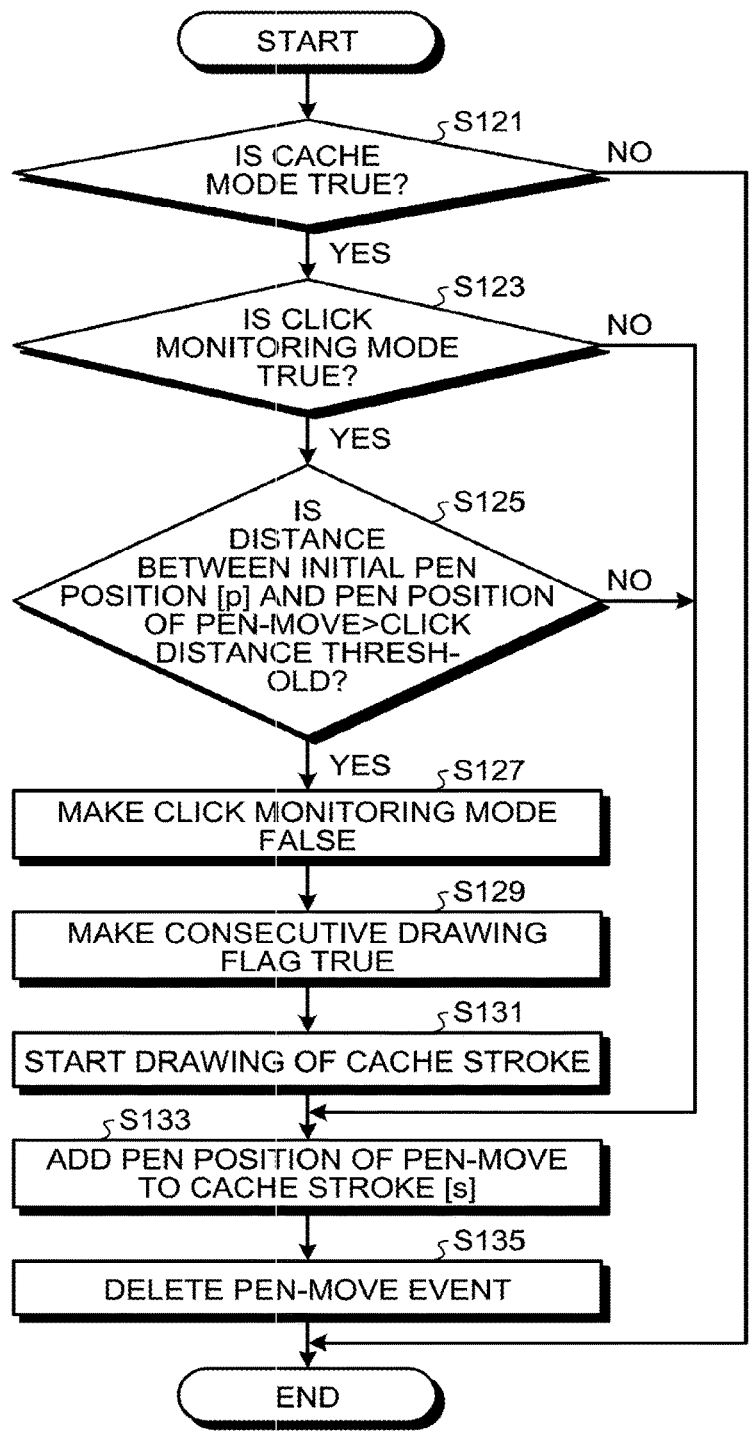
FIG. 27 is a flowchart illustrating the sequence of processing performed when a preview event of pen-move was received.

The processing performed when the event distribution unit 25 received a preview event of pen-move (Preview-MouseMove) will be described. FIG. 27 is a flowchart illustrating the sequence of processing performed at the time of receiving a preview event of pen-move. The present processing is the processing in which the click event processor 251 determines whether an event of pen-move concerns a click operation or concerns the drawing of a stroke image. When the click event processor 251 determines that the event of pen-move is not the one concerning a click operation, the cache stroke processor 321 starts the drawing of a stroke image.

At Step S121, the click event processor 251 checks whether the cache mode is "true". When the cache mode is "false" (No at Step S121), the click event processor 251 ends the processing. When the cache mode is "true" (Yes at Step S121), the click event processor 251 performs the processing at Step S123.

At Step S123, the click event processor 251 checks whether the click monitoring mode is "true". When the click monitoring mode is "false" (No at Step S123), the click event processor 251 performs the processing at Step S133. When the click monitoring mode is "true" (Yes at Step S123), the click event processor 251 performs the processing at Step S125.

At Step S125, the click event processor 251 determines whether the distance between the initial pen position [p] (that is, the coordinate position of the pen-down) and the coordinate position of the pen-move is greater than a "click-distance threshold".

The "click-distance threshold" is a threshold to determine, based on whether the contact position of the electronic pen 4 with respect to the display 3 has been moved, whether the drawing of a stroke image was performed or a click operation was performed. While the contact position of the electronic pen 4 hardly moves when it is a click operation, the contact position of the electronic pen 4 moves during the drawing of a stroke image, except when drawing a dot. Consequently, when the contact position of the electronic pen 4 moved in excess of the "click-distance threshold", it is determined that the drawing of a stroke image has been performed, and the subsequent processing is performed.

When the distance between the coordinate position of the initial pen position [p] and the coordinate position of the pen-move is smaller than the "click-distance threshold" (No at Step S125), the click event processor 251 performs the processing at Step S133. When the distance between the coordinate position of the initial pen position [p] and the coordinate position of the pen-move is greater than the "click-distance threshold" (Yes at Step S125), that is, when the pen event is the one concerning the drawing of a stroke image, the click event processor 251 performs the processing at Step S127 and subsequent steps.

At Step S127, the click event processor 251 makes the click monitoring mode "false". After this step, a series of pen events is processed regarding the pen events, until a preview event of pen-up is detected, as the ones concerning the drawing of a stroke image.

At Step S129, the click event processor 251 makes the consecutive drawing flag "true".

At Step S131, in response to the fact that the consecutive drawing flag was made "true", the cache stroke processor 321 starts the drawing of a stroke image. That is, the cache stroke processor 321 reads out the data in the cache stroke [s] and starts drawing a stroke image.

At Step S133, the cache stroke processor 321 adds the pen position of the pen-move to the cache stroke [s].

At Step S135, the click event processor 251 deletes a pen-move event received after receiving the preview event of pen-move.

The processing illustrated in the flowchart is performed each time a pen-move event is received when a plurality of pen-move events are received within a series of pen events including a single pen-down and a single pen-up. In this case, at Step S125, the click event processor 251 determines whether the distance between the initial pen position [p] and the coordinate position of the latest pen-move is greater than the "click-distance threshold".

Pen-Up Processing

Figure 28:
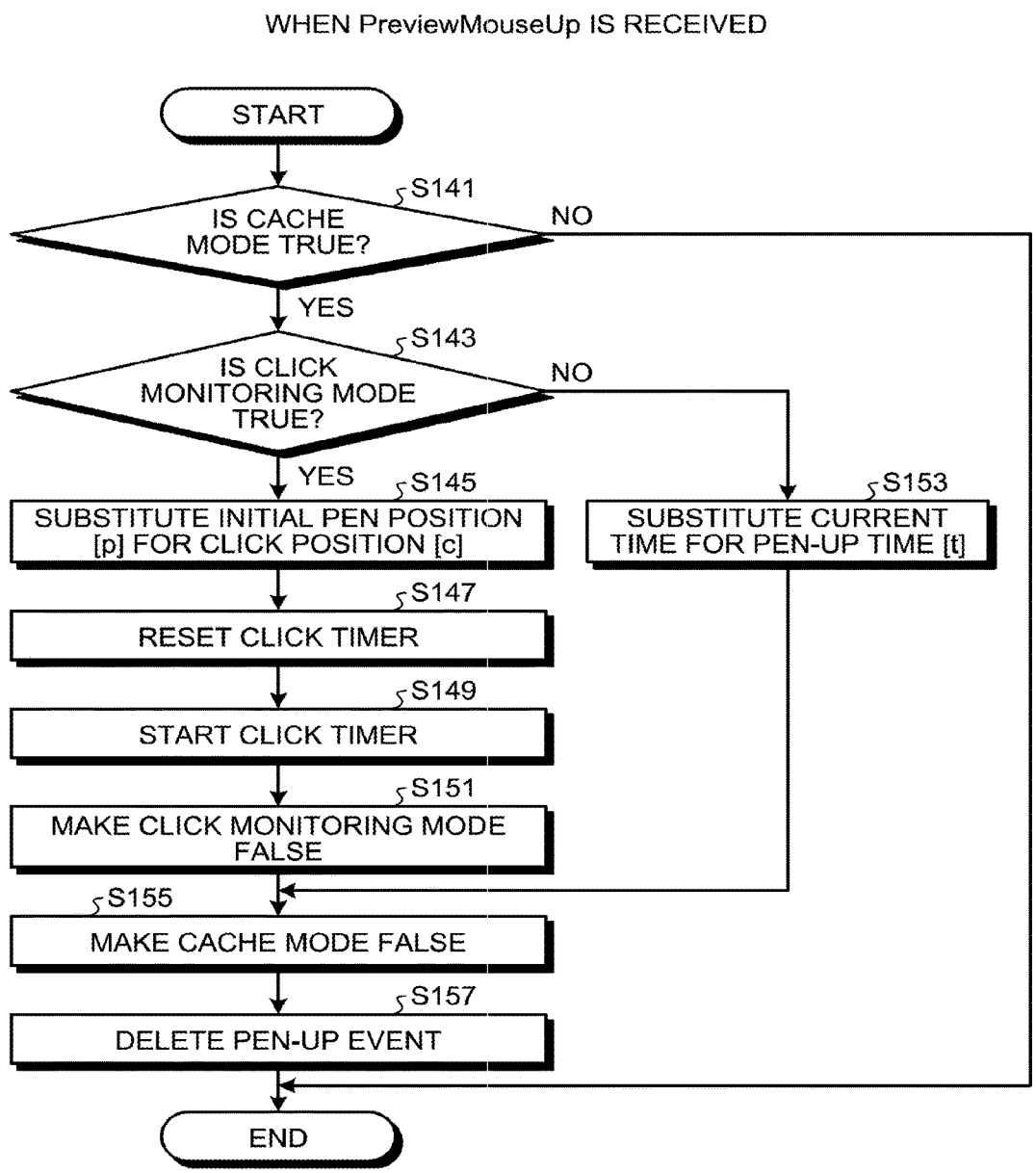
FIG. 28 is a flowchart illustrating the sequence of processing performed when a preview event of pen-up was received.

The processing performed when the event distribution unit 25 received a preview event of pen-up (PreviewMouseUp) will be described. FIG. 28 is a flowchart illustrating the sequence of processing performed at the time of receiving a preview event of pen-up.

When a pen-up event that the event distribution unit 25 received is an event concerning a click operation, the processing of transmitting a click event to the notebook PC 11 in remote operation by the event transmitting unit 89 is performed. However, when a dot as in an alphabet of "i" is hand-drawn, it is necessary to prevent the dot from being determined to be a click operation. Consequently, in the present processing, the timing of sending a click event is delayed by a click timer for a designated time.

At Step S141, the click event processor 251 checks whether the cache mode is "true". When the cache mode is "false" (No at Step S141), the click event processor 251 ends the processing. When the cache mode is "true" (Yes at Step S141), the click event processor 251 performs the processing at Step S143.

At Step S143, the click event processor 251 checks whether the click monitoring mode is "true". When the click monitoring mode is "false" (No at Step S143), the click event processor 251 performs the processing at Step S153. When the click monitoring mode is "true" (Yes at Step S143), the click event processor 251 performs the processing at Step S145.

At Step S145, the click event processor 251 substitutes the initial pen position [p] for the click position [c]. When the stroke image is consecutively drawn, as indicated at Step S103, the initial pen position [p] is substituted with the pen position of the latest pen-down. Consequently, the click event processor 251 temporarily stores the position of a click or the position of a drawn dot in the click position [c] so that the coordinates of the click position are not lost.

At Step S147, the click event processor 251 stops the click timer 252 and performs reset processing.

At Step S149, the click event processor 251 starts the click timer 252.

At Step S151, the click event processor 251 makes the click monitoring mode "false".

At Step S153, the click event processor 251 substitutes the current time for the pen-up time [t]. When the click monitoring mode is "false", that is, only when the pen event is determined to be the one concerning the stroke drawing, the pen-up time [t] is newly substituted with the time. Conversely, when the click monitoring mode is "true", that is, when there is a need to monitor whether the pen event is a click operation or dot drawing by stroke, the pen-up time [t] is not substituted with the new time.

At Step S155, the click event processor 251 makes the cache mode "false".

At Step S157, the click event processor 251 deletes a pen-up event received after receiving the preview event of pen-up.

Processing at Click Timer End

Figure 29:
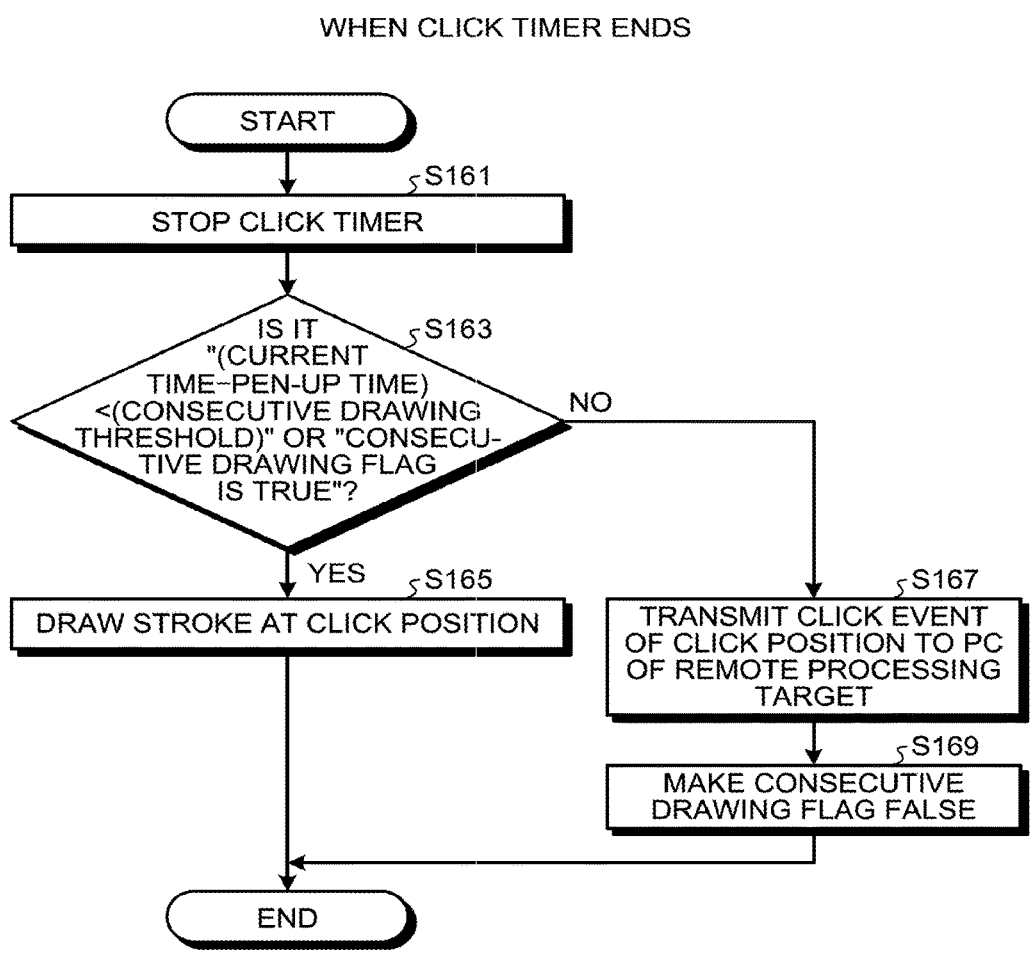
FIG. 29 is a flowchart illustrating the sequence of processing performed when a click timer ended.

The processing performed at the time the click timer ended will be described. FIG. 29 is a flowchart illustrating the sequence of processing performed at the time the click timer ended. The present processing is the processing in which, when the user dotted immediately after drawing a hand-drawn image and when the user drew a hand-drawn image immediately after dotting as in the letter of alphabet "i", that dot is determined to be not a click operation but a stroke image.

At Step S161, the click event processor 251 stops the click timer.

At Step S163, the click event processor 251 checks whether it is "(current time–pen-up time)<(consecutive drawing threshold)" or "the consecutive drawing flag is true". The detail of the condition at this step will be described later. When the condition is satisfied (Yes at Step S163), the click event processor 251 performs the processing at Step S165. When the condition is not satisfied (No at Step S163), the click event processor 251 performs the processing at Step S167.

At Step S165, the click event processor 251 draws a dot on the display 3 corresponding to the click position [c] as a stroke image.

At Step S167, the click event processor 251 transmits a click event at the click position [c] to the notebook PC 11 of the operation target device via the event transmitting unit 89.

At step S169, the click event processor 251 makes the consecutive drawing flag "false".

Figure 30A:
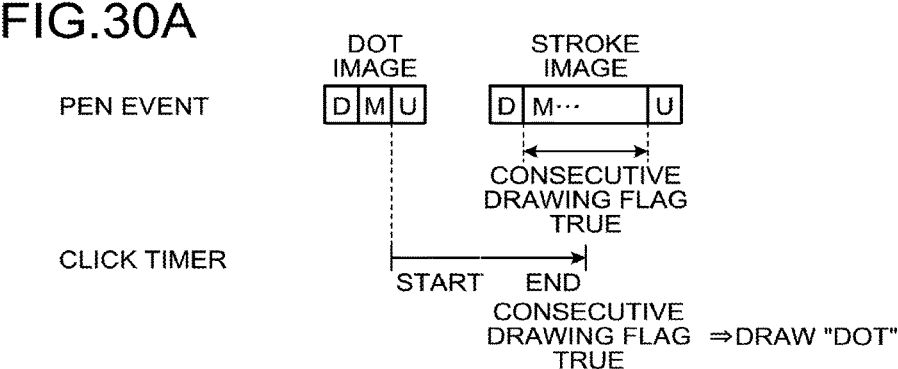
FIG. 30A is a diagram illustrating one example of a timing diagram for explaining the processing of a click event.
Figure 30B:
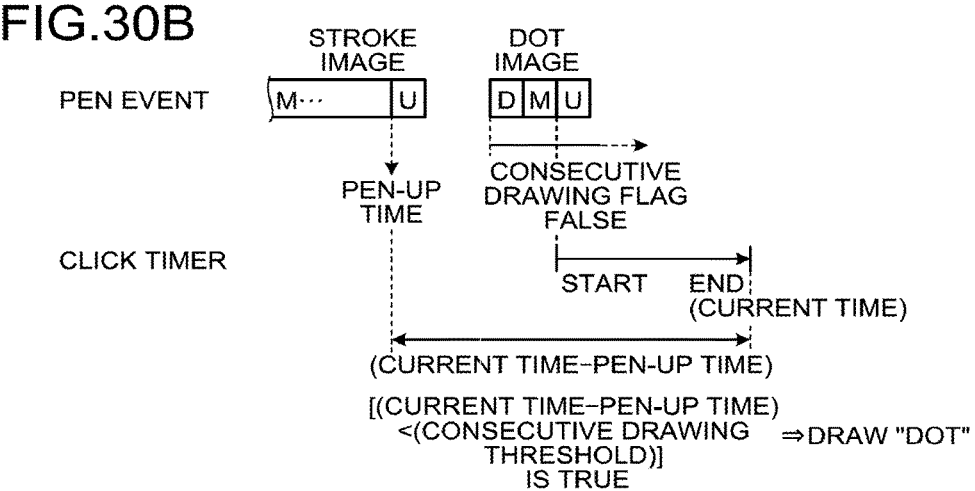
FIG. 30B is a diagram illustrating one example of a timing diagram for explaining the processing of a click event.
Figure 30C:
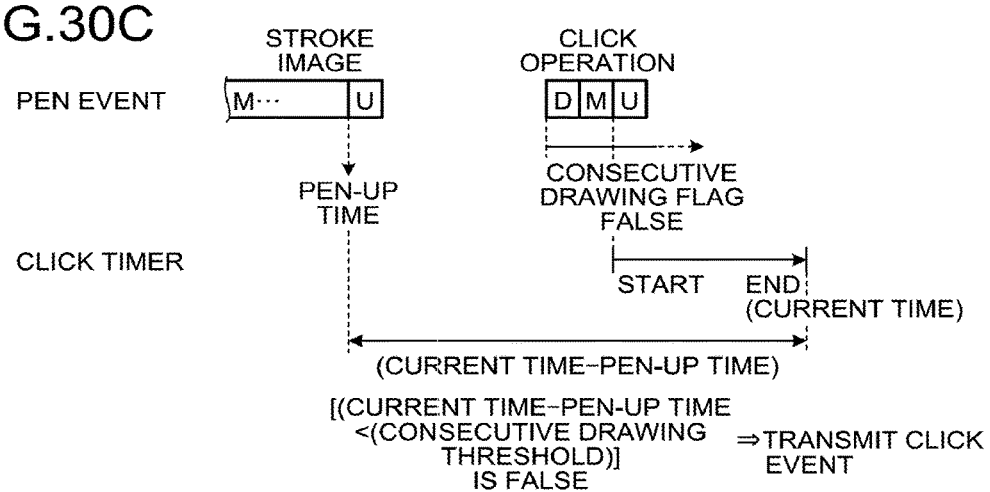
FIG. 30C is a diagram illustrating one example of a timing diagram for explaining the processing of a click event.

The foregoing processing will be described based on the timing diagram. FIGS. 30A to 30C are diagrams illustrating one example of timing diagrams for explaining the processing of a click event. In the diagrams, D represents a pen-down event, M . . . represents a pen-move event, and U represents a pen-up event. A set of "D, M . . . , U" represents a series of pen events.

FIG. 30A illustrates an example of inputting a stroke of a line image and the like after having input a stroke of a dot image.

In this case, the click timer 252 starts clocking at the time of pen-up of the former dot image, and during the input of the latter stroke image (after pen-down, before pen-up), the click timer ends the clocking. At the time the click timer stopped, because the consecutive drawing flag is "true" (Yes at Step S163), a dot is drawn on the display 3 corresponding to the click position [c] as a stroke image, at Step S165.

As just described, the time of the click timer 252 is set such that the clocking ends while the pen move events of a stroke image, which are consecutively input after the pen-up of the dot image, are being issued.

FIG. 30B illustrates an example of inputting a stroke of a dot image after having input a stroke of a line image and the like. The pen event that arises by the stroke of the dot image is a determination-target pen event that ought to be determined whether it is an event concerning the stroke of a dot image or an event concerning a click operation.

In this case, at the time of pen-up of the former stroke (at the time of ending the pen event concerning the other stroke acquired prior to the determination-target pen event), the pen-up time [t] is substituted (Step S153). At the time of pen-up of the latter dot image, the click timer starts clocking. At the time the click timer ends, because "(current time–pen-up time)<(consecutive drawing threshold)" turns into "true" (Yes at Step S163), a dot is drawn on the display 3 corresponding to the click position [c] as a stroke image, at Step S165.

The "current time–pen-up time" represents the elapsed time from the end of the pen event that concerns the other stroke acquired prior to the determination-target pen event. In this example, because the drawing of a stroke image is not performed after drawing the dot, the consecutive drawing flag remains "false".

FIG. 30C illustrates an example of performing a click operation after having input a stroke of a line image and the like. The pen event that arises by the click operation is a determination-target pen event that ought to be determined whether it is an event concerning the stroke of the dot image or an event concerning a click operation.

In this case, at the time of pen-up of the former stroke image, the pen-up time [t] is substituted (Step S153). At the time of pen-up of the latter click operation, the click timer starts clocking. At the time the click timer ends, because the "(current time–pen-up time)<(consecutive drawing threshold)" turns into "false" and the consecutive drawing flag is "false" (No at Step S163), a click event at the click position [c] is transmitted to the notebook PC 11, at Step S167.

As in the foregoing, the "consecutive drawing threshold" is set to the time in which a maximum time allowed as an interval of pen-up time of the consecutive two stroke images is added to the time set to the click timer 252.

Advantageous Effects

As in the foregoing, according to the embodiment, when drawing a stroke image consecutively, a dot that is input as an image is not recognized as a click operation. Consequently, without switching the operation target device to the information processing apparatus, the remote operation can be performed while drawing a stroke image, and thus the usability is improved.

Summary of Operations and Effects of Invention

First Aspect

An image processing apparatus (the electronic blackboard 2) according to a first aspect includes an event acquisition unit (the event distribution unit 25) that acquires a pen event based on an operation on a screen (the display 3), a drawing-click determining unit (the click event processor 251) that determines whether the pen event is an event concerning a stroke of a dot image or concerning a click operation, and a countdown timer (the click timer 252) that starts clocking when the drawing-click determining unit receives a determination-target pen event to determine, and the drawing-click determining unit determines that the determination-target pen event is an event concerning a stroke of a dot image when the clocking has ended and the event acquisition unit has acquired a pen event concerning another stroke, or when an elapsed time from an end of a pen event concerning another stroke acquired prior to the determination-target pen event is within a certain period of time.

According to the first aspect, a stroke of a dot image can be discriminated from a click operation, and thus a click operation can be performed on a notebook PC remotely while performing stroke drawing.

Second Aspect

In the image processing apparatus (the electronic blackboard 2) according to a second aspect, the drawing-click determining unit (the click event processor 251) determines that the determining-target pen event is an event concerning a click operation when the drawing-click determining unit does not determine that the determining-target pen event is an event concerning a stroke of a dot image.

According to the second aspect, a stroke of a dot image can be discriminated from a click operation, and thus a click operation can be performed on the notebook PC remotely while performing stroke drawing.

Third Aspect

The image processing apparatus (the electronic blackboard 2) according to a third aspect further includes a coordinate detector (the coordinate detector 22) that detects the position coordinates of each pen event on a display screen (the display 3) and a cache stroke processing unit (the cache stroke processor 321) that temporarily stores in a cache memory [s] each set of coordinates that the coordinate detector has detected on a series of pen events acquired by the event acquisition unit (the event distribution unit 25), and the cache stroke processing unit reads out the coordinates of the pen event from the cache memory and draws a stroke image when the pen event is an event concerning a stroke.

According to the third aspect, the drawing of a stroke is made to delay by temporarily storing each set of coordinates of a series of pen events in the cache memory [s], and thus it can be reliably determined whether a pen event is a stroke of a dot image or is a click operation.

Fourth Aspect

In the image processing apparatus according to a fourth aspect, the drawing-click determining unit (the click event processor 251) determines that the pen event is an event concerning a stroke of a line image when a distance of position coordinates between a pen-down event and a pen-move event included in a series of pen events exceeds a click distance threshold, and determines that the pen event is an event concerning a stroke of a dot image or an event concerning a click operation when the distance of position coordinates between the pen-down event and the pen-move event is equal to or less than the click distance threshold.

According to the fourth aspect, a pen event that is apparent to be a stroke is excluded from the determination-target pen event, and thus it facilitates the processing of determining whether it is a stroke of a dot image or is a click operation.

Fifth Aspect

An image processing system according to a fifth aspect is the image processing system 1 including the image processing apparatus (the electronic blackboard 2) described in any one of claims 1 to 4, and an information processing apparatus (the notebook PC 11) connected to the image processing apparatus via the communication network 9, and the image processing apparatus includes a click event generator (the click event processor 251) that generates a click event when the drawing-click determining unit (the click event processor 251) determines that the determination-target pen event is an event concerning a click operation, and the event transmitting unit 89 that transmits the click event to the information processing apparatus via the communication network.

According to the fifth aspect, it has the same effect as that in the first aspect.

Sixth Aspect

An image processing method according to a sixth aspect includes acquiring, by an event acquisition unit (the event distribution unit 25), a pen event based on an operation on a screen (the display 3); determining, by a drawing-click determining unit (the click event processor 251), whether the pen event is an event concerning a stroke of a dot image or concerning a click operation; and starting clocking by a countdown timer (the click timer 252) when the drawing-click determining unit receives a determination-target pen event to determine, and the drawing-click determining unit determines that the determination-target pen event is an event concerning a stroke of a dot image when the clocking has ended and the event acquisition unit has acquired a pen event concerning another stroke, or when an elapsed time from an end of a pen event concerning another stroke that has been acquired immediately before the determination-target pen event is within a certain period of time.

According to the sixth aspect, it has the same effect as that in the first aspect.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

What is claimed is:

1. An image processing apparatus, comprising:
event acquisition circuitry configured to acquire a current pen event based on an operation on a screen of the image processing apparatus;
processing circuitry configured to determine whether the current pen event is a stroke of a dot image or a click operation; and
a timer configured to start timing, in response to releasing the pen from the screen during the current pen event, and when a distance of the movement, during the current pen event, of the pen on the screen before being released is below a click distance threshold, wherein:

the processing circuitry is further configured to determine that the current pen event is the stroke of a dot image when an elapsed time from a prior pen event of releasing the pen from the screen until an expiration of the timer is within a certain period of time, and the processing circuitry is further configured to determine that the current pen event is a click operation when the elapsed time from the prior pen event of releasing the pen from the screen until the expiration of the timer is greater than the certain period of time.

2. The image processing apparatus according to claim 1, further comprising:

a coordinate detector configured to detect position coordinates of each of the pen events on the screen; and a cache stroke processing circuit configured to temporarily store, in a cache memory, each set of coordinates that the coordinate detector has detected on a series of the pen events acquired by the event acquisition circuitry, wherein the cache stroke processing circuit is further configured to read out the coordinates of the current pen event from the cache memory and draw a stroke image when the current pen event is the stroke.

3. The image processing apparatus according to claim 2, wherein:

the processing circuitry is further configured to determine that the current pen event is a stroke of a line image when a distance between position coordinates of a pen-down event and a pen-move event included in the series of pen events exceeds the click distance threshold, and determine that the current pen event is the stroke of a dot image or the click operation when the distance of position coordinates between the pen-down event and the pen-move event is equal to or less than the click distance threshold.

4. An image processing system, comprising:

the image processing apparatus according to claim 1; and an information processing apparatus connected to the image processing apparatus via a communication network, the image processing apparatus further including:

click event generator circuitry configured to generate a click event when the processing circuitry determines that the current pen event is the click operation, and an event transmitter configured to transmit the click event to the information processing apparatus via the communication network.

5. An image processing method, comprising:

acquiring a current pen event based on an operation on a screen;

determining whether the current pen event is a stroke of a dot image or a stroke of a click operation; and starting a timer, in response to releasing the pen from the screen during the current pen event, and when a distance of the movement, during the current pen event, of the pen on the screen before being released is below a click distance threshold, wherein:

the determining further comprises determining that the current pen event is a stroke of a dot image when an elapsed time from a prior pen event of releasing the pen from the screen until an expiration of the timer is within a certain period of time, and the determining further comprises determining that the current pen event is a click operation when the elapsed time from an end of the prior pen event of releasing the pen from the screen until the expiration of the timer is greater than the certain period of time.

6. The method according to claim 5, further comprising:

detecting position coordinates of each of the pen events on the screen;

temporarily storing, in a cache memory, each set of coordinates that have been detected by the detecting on a series of the pen events acquired by the acquiring; and reading out the coordinates of the current pen event from the cache memory and drawing a stroke image when the current pen event is the stroke.

7. The method according to claim 6, further comprising:

determining that the current pen event is a stroke of a line image when a distance between position coordinates of a pen-down event and a pen-move event included in the series of pen events exceeds the click distance threshold; and determining that the current pen event is the stroke of a dot image or the click operation when the distance of position coordinates between the pen-down event and the pen-move event is equal to or less than the click distance threshold.

8. The method according to claim 5, further comprising:

generating a click event when the current pen event is the click operation, and transmitting the click event to an information processing apparatus via a communication network.

9. An image processing apparatus, comprising:

event acquisition circuitry configured to acquire a current pen event based on an operation on a screen of the image processing apparatus;

means for determining whether the current pen event is a stroke of a dot image or a click operation; and a timer configured to start timing, in response to releasing the pen from the screen during the current pen event, and when a distance of the movement, during the current pen event, of the pen on the screen before being released is below a click distance threshold, wherein:

the means for determining is for further determining that the current pen event is the stroke of a dot image when an elapsed time from a prior pen event of releasing the pen from the screen until an expiration of the timer is within a certain period of time, and the means for determining is for further determining that the current pen event is a click operation when the elapsed time from the prior pen event of releasing the pen from the screen until the expiration of the timer is greater than the certain period of time.

10. The image processing apparatus according to claim 9, further comprising:

a coordinate detector configured to detect position coordinates of each of the pen events on the screen; and a cache stroke processing circuit configured to temporarily store, in a cache memory, each set of coordinates that the coordinate detector has detected on a series of the pen events acquired by the event acquisition circuitry, wherein the cache stroke processing circuit is further configured to read out the coordinates of the current pen event from the cache memory and draw a stroke image when the current pen event is the stroke.

11. The image processing apparatus according to claim 10, wherein:
the means for determining is further configured to determine that the current pen event is a stroke of a line image when a distance between position coordinates of a pen-down event and a pen-move event included in the series of pen events exceeds the click distance threshold, and determine that the current pen event is the stroke of a dot image or the click operation when the distance of position coordinates between the pen-down event and the pen-move event is equal to or less than the click distance threshold.

* * * * *